(12) United States Patent
Fukushima et al.

(10) Patent No.: US 10,499,076 B2
(45) Date of Patent: *Dec. 3, 2019

(54) PICTURE ENCODING DEVICE AND PICTURE ENCODING METHOD

(71) Applicant: JVC KENWOOD Corporation, Yokohama-shi (JP)

(72) Inventors: Shigeru Fukushima, Yokosuka (JP); Hiroya Nakamura, Yokosuka (JP); Masayoshi Nishitani, Yokosuka (JP); Motoharu Ueda, Yokosuka (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,047

(22) Filed: Nov. 20, 2018

(65) Prior Publication Data

US 2019/0089973 A1 Mar. 21, 2019

Related U.S. Application Data

(63) Continuation of application No. 16/035,885, filed on Jul. 16, 2018, now Pat. No. 10,171,829, which is a (Continued)

(30) Foreign Application Priority Data

Mar. 28, 2012 (JP) ................................. 2012-073574
Mar. 28, 2012 (JP) ................................. 2012-073575

(51) Int. Cl.
*H04N 19/463* (2014.01)
*H04N 19/176* (2014.01)
(Continued)

(52) U.S. Cl.
CPC ......... *H04N 19/463* (2014.11); *H04N 19/124* (2014.11); *H04N 19/14* (2014.11); *H04N 19/176* (2014.11); *H04N 19/196* (2014.11)

(58) Field of Classification Search
CPC .... H04N 19/124; H04N 19/14; H04N 19/176; H04N 19/196; H04N 19/463;
(Continued)

(56) References Cited

U.S. PATENT DOCUMENTS 10,063,874 B2   8/2018   Fukushima et al.
2010/0054279 A1*   3/2010   Feldbauer ............ G10L 19/005
                                                                     370/475
(Continued)

FOREIGN PATENT DOCUMENTS

JP    2011514056 A    4/2011
JP    2011091772 A    5/2011
(Continued)

OTHER PUBLICATIONS

Aoki et al., "CE4 Subtest 1: Rate Control Friendly Spatial QP Prediction Based on Intra Prediction (test 1.3)," Joint Collaborative Team on Video Coding (JCT-VC) of ITU-T SG16 WP3 and ISO/IEC JTCI/SC29/WGLL, 8th Meeting: San Jose, CA, Feb. 1-10, 2012.

(Continued)

*Primary Examiner* — Nathnael Aynalem
(74) *Attorney, Agent, or Firm* — Brundidge & Stanger, P.C.

(57) ABSTRACT

There is provided a picture encoding device that encodes a picture and encodes a difference quantization parameter in a unit of a quantization coding block which is divided from the picture and is a management unit of a quantization parameter. A quantization parameter calculator derives a quantization parameter of the quantization coding block to be (Continued)

encoded. A prediction quantization parameter derivation unit derives a prediction quantization parameter using the quantization parameters of a plurality of quantization coding blocks which precede the quantization coding block to be encoded in order of encoding. A difference quantization parameter generator derives a difference quantization parameter of the quantization coding block to be encoded, using a difference between the quantization parameter of the quantization coding block to be encoded and the prediction quantization parameter. A first bitstream generator encodes the difference quantization parameter of the quantization coding block to be encoded.

2 Claims, 19 Drawing Sheets

Related U.S. Application Data continuation of application No. 14/478,572, filed on Sep. 5, 2014, now Pat. No. 10,063,874, which is a continuation of application No. PCT/JP2013/001875, filed on Mar. 19, 2013.

(51) Int. Cl.
*H04N 19/124* (2014.01)
*H04N 19/196* (2014.01)
*H04N 19/14* (2014.01)

(58) Field of Classification Search
CPC .... H04N 19/174; H04N 19/197; H04N 19/51; H04N 19/513; H04N 19/593; H04N 19/61
USPC ........................................ 375/240.01–240.29
See application file for complete search history.

(56) References Cited

U.S. PATENT DOCUMENTS

| | | | | |
|---|---|---|---|---|
| 2011/0150077 A1* | 6/2011 | Kishore | ............... | H04N 19/176 375/240.03 |
| 2012/0328004 A1* | 12/2012 | Coban | .................. | H04N 19/105 375/240.03 |
| 2013/0077871 A1* | 3/2013 | Lu | ............................ | G06K 9/36 382/197 |

FOREIGN PATENT DOCUMENTS

| JP | 201273575 A | 10/2013 |
|---|---|---|
| WO | 2011152518 A1 | 12/2011 |
| WO | 2011156458 A1 | 12/2011 |

OTHER PUBLICATIONS

Notification of Reasons for Refusal in Japanese Patent Application No. 2012-073574 dated Oct. 20, 2015.
Notification of Reasons for Refusal in Japanese Patent Application No. 2014-241430 dated Oct. 20, 2015.
International Search Report in PCT International Application No. PCT/JP2013/001875, dated Jun. 25, 2013.
International Preliminary Report on Patentability and Written Opinion in PCT International Application No. PCT/JP2013/001875, dated Oct. 1, 2014.
Notification of Reasons for Refusal in Japanese Patent Application No. 2012-073575, dated Aug. 19, 2014.
Nakamura et al., "Non-CE4: Compatible QP prediction with RC and AQ," Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, pp. 1-12, Document: JCTVC-110204.
Aoki et al., "Non-CE4: Rate control friendly spatial QP prediction," Joint Collaborative Team on Video Coding (JCT-VC of ITU-T SG16 WP3 and ISO/IEC JTC1/SC29/WG11, 7th Meeting: Geneva, CH, Nov. 21-30, 2011, pp. 1-9, Document: JCTVC-G1028.

* cited by examiner

16 × 16 BLOCKS

FIG.10

| ABSOLUTE VALUE OF DIFFERENCE | CODE WORD |
|---|---|
| 0 | 1 |
| 1 | 001 |
| −1 | 011 |
| 2 | 0001 |
| −2 | 0101 |
| 3 | 00001 |
| −3 | 01001 |
| ⋮ | ⋮ |

PICTURE ENCODING DEVICE AND PICTURE ENCODING METHOD

CROSS-REFERENCED TO RELATED APPLICATION

The present application is a Continuation Application of U.S. application Ser. No. 16/035,885, filed Jul. 16, 2018; which is a Continuation of U.S. application Ser. No. 14/478,572, filed Sep. 5, 2014, now U.S. Pat. No. 10,063,874; which is a Continuation of International Application of PCT/JP2013/001875, filed Mar. 19, 2013; which in turn claims the benefit of Japanese Application No. 2012-073574, filed on Mar. 28, 2012; and Japanese Application No. 2012-073575, filed on Mar. 28, 2012, the disclosures of which Applications are incorporated by reference herein.

BACKGROUND OF THE INVENTION

1. Field of the Invention

The present invention relates to a picture encoding and decoding technique, and more particularly, to a picture encoding and decoding technique using quantization parameter prediction encoding.

2. Description of the Related Art

A digital moving picture encoding system, such as MPEG-2 Part2 (hereinafter, referred to as MPEG-2) or MPEG-4 Part10/H.264 (hereinafter, referred to as AVC), divides a picture into blocks with a predetermined size, encodes the picture, and transmits a quantization parameter indicating the roughness of quantization for a prediction error signal (or simply a picture signal). An encoder side variably controls the quantization parameter in units of predetermined blocks. In this way, it is possible to control the amount of code or to improve subjective picture quality.

Adaptive quantization has been generally used as a quantization parameter control method for improving the subjective picture quality. In the adaptive quantization, the quantization parameter is changed depending on the activity of each macroblock such that fine quantization is performed in a flat portion in which deterioration is likely to be visually conspicuous and rough quantization is performed in a complicated portion of a picture in which deterioration is relatively less likely to be conspicuous. That is, in a macroblock with high activity in which the number of bits allocated during encoding is likely to be large, the quantization parameter is changed such that a large quantization scale is set. As a result, it is possible to improve the subjective picture quality while performing control such that the number of bits in the encoded picture data is minimized.

In MPEG-2, it is determined whether the quantization parameter of the previous block in order of encoding and decoding is identical to the quantization parameter of the block to be encoded and the quantization parameter is transmitted when the quantization parameters are not identical to each other. In AVC, difference encoding is performed on the quantization parameter of the block to be encoded, using the quantization parameter of the previous block in order of encoding and decoding as a prediction value. This is based on the fact that, since code amount control is generally performed in order of encoding, the quantization parameter of the previous block in order of encoding is closest to the quantization parameter of the coding block, and this is intended to suppress the information amount of the quantization parameter to be transmitted.

Patent Literature 1: JP 2011-91772 A

The quantization parameter control method according to the related art uses the quantization parameter of the encoded previous block as a prediction quantization parameter, calculates the difference between the prediction quantization parameter and the quantization parameter of the block to be encoded, and encodes the calculated difference quantization parameter. According to this structure, the amount of code of the quantization parameter is reduced. However, in the structure in which the quantization parameter of the previous block is used as the prediction quantization parameter, when quantization parameter control is performed by adaptive quantization, the difference quantization parameter becomes large and the code amount increases.

SUMMARY OF THE INVENTION

The invention has been made in view of the above-mentioned problems and an object of the invention is to provide a technique for reducing the amount of code of the quantization parameter and improving encoding efficiency.

In order to solve the problem, according to an aspect of the present invention, a picture encoding device that encodes a picture and encodes a difference quantization parameter in a unit of a quantization coding block which is divided from the picture and is a management unit of a quantization parameter, includes: a quantization parameter derivation unit (110) that derives a quantization parameter of the quantization coding block to be encoded; a prediction quantization parameter derivation unit (114) that derives a prediction quantization parameter using the quantization parameters of a plurality of quantization coding blocks which precede the quantization coding block to be encoded in order of encoding; a difference quantization parameter derivation unit (111) that derives a difference quantization parameter of the quantization coding block to be encoded, using a difference between the quantization parameter of the quantization coding block to be encoded and the prediction quantization parameter; and an encoder (112) that encodes the difference quantization parameter.

According to another aspect of the present invention, there is provided a picture encoding method. The picture encoding method that encodes a picture and encodes a difference quantization parameter in a unit of a quantization coding block which is divided from the picture and is a management unit of a quantization parameter, includes: a quantization parameter derivation step of deriving a quantization parameter of the quantization coding block to be encoded; a prediction quantization parameter derivation step of deriving a prediction quantization parameter using the quantization parameters of a plurality of quantization coding blocks which precede the quantization coding block to be encoded in order of encoding; a difference quantization parameter derivation step of deriving a difference quantization parameter of the quantization coding block to be encoded, using a difference between the quantization parameter of the quantization coding block to be encoded and the prediction quantization parameter; and an encoding step of encoding the difference quantization parameter.

According to another aspect of the present invention, there is provided a transmission device. The transmission device includes: a packet processor that packetizes a bitstream encoded by a picture encoding method of encoding a difference quantization parameter in a unit of a quantization coding block, which is divided from a picture and is a management unit of a quantization parameter, together with the picture to obtain a bitstream; and a transmitter that transmits the packetized bitstream. The picture encoding method includes: a quantization parameter derivation step of deriving a quantization parameter of the quantization coding block to be encoded; a prediction quantization parameter derivation step of deriving a prediction quantization parameter using the quantization parameters of a plurality of quantization coding blocks which precede the quantization coding block to be encoded in order of encoding; a difference quantization parameter derivation step of deriving a difference quantization parameter of the quantization coding block to be encoded, using a difference between the quantization parameter of the quantization coding block to be encoded and the prediction quantization parameter; and an encoding step of encoding the difference quantization parameter.

According to another aspect of the present invention, there is provided a transmission method. The transmission method includes: a packet processing step of packetizing a bitstream encoded by a picture encoding method of encoding a difference quantization parameter in a unit of a quantization coding block, which is divided from a picture and is a management unit of a quantization parameter, together with the picture to obtain a bitstream; and a transmission step of transmitting the packetized bitstream. The picture encoding method includes a quantization parameter derivation step of deriving a quantization parameter of the quantization coding block to be encoded, a prediction quantization parameter derivation step of deriving a prediction quantization parameter using the quantization parameters of a plurality of quantization coding blocks which precede the quantization coding block to be encoded in order of encoding, a difference quantization parameter derivation step of deriving a difference quantization parameter of the quantization coding block to be encoded, using a difference between the quantization parameter of the quantization coding block to be encoded and the prediction quantization parameter; and an encoding step of encoding the difference quantization parameter.

According to an aspect of the present invention, a picture decoding device that decodes a picture and decodes a bitstream in which a difference quantization parameter is encoded in a unit of a quantization decoding block which is divided from the picture and is a management unit of a quantization parameter, includes: a decoder (202) that decodes the bitstream in the unit of the quantization decoding block and extracts a difference quantization parameter of the quantization decoding block to be decoded; a prediction quantization parameter derivation unit (205) that derives a prediction quantization parameter using the quantization parameters of a plurality of quantization decoding blocks which precede the quantization decoding block to be decoded in order of decoding; and a quantization parameter derivation unit (203) that adds the difference quantization parameter of the quantization decoding block to be decoded and the prediction quantization parameter to derive the quantization parameter of the quantization decoding block to be decoded.

According to another aspect of the present invention, there is provided a picture decoding method. The picture decoding method that decodes a picture and decodes a bitstream in which a difference quantization parameter is encoded in a unit of a quantization decoding block which is divided from the picture and is a management unit of a quantization parameter, includes: a decoding step of decoding the bitstream in the unit of the quantization decoding block and extracting a difference quantization parameter of the quantization decoding block to be decoded; a prediction quantization parameter derivation step of deriving a prediction quantization parameter using the quantization parameters of a plurality of quantization decoding blocks which precede the quantization decoding block to be decoded in order of decoding; and a quantization parameter derivation step of adding the difference quantization parameter of the quantization decoding block to be decoded and the prediction quantization parameter to derive the quantization parameter of the quantization decoding block to be decoded.

According to another aspect of the present invention, there is provided a reception device. The reception device that receives a bitstream and decodes the bitstream, includes: a receiver that receives a bitstream obtained by packetizing a bitstream in which a difference quantization parameter is encoded in a unit of a quantization decoding block, which is divided from a picture and is a management unit of a quantization parameter, together with the picture; a restoration unit that performs packet processing on the received packetized bitstream to restore the packetized bitstream to an original bitstream; a decoder that decodes the restored bitstream in the unit of the quantization decoding block and extracts a difference quantization parameter of a quantization decoding block to be decoded; a prediction quantization parameter derivation unit that derives a prediction quantization parameter using the quantization parameters of a plurality of quantization decoding blocks which precede the quantization decoding block to be decoded in order of decoding; and a quantization parameter derivation unit that adds the difference quantization parameter of the quantization decoding block to be decoded and the prediction quantization parameter to derive the quantization parameter of the quantization decoding block to be decoded.

According to another aspect of the present invention, there is provided a reception method. The reception method that receives a bitstream and decodes the bitstream, includes: a reception step of receiving a bitstream obtained by packetizing a bitstream in which a difference quantization parameter is encoded in a unit of a quantization decoding block, which is divided from a picture and is a management unit of a quantization parameter, together with the picture; a restoration step of performing packet processing on the received packetized bitstream to restore the packetized bitstream to an original bitstream; a decoding step of decoding the restored bitstream in the unit of the quantization decoding block to extract a difference quantization parameter of a quantization decoding block to be decoded; a prediction quantization parameter derivation step of deriving a prediction quantization parameter using the quantization parameters of a plurality of quantization decoding blocks which precede the quantization decoding block to be decoded in order of decoding; and a quantization parameter derivation step of adding the difference quantization parameter of the quantization decoding block to be decoded and the prediction quantization parameter to derive the quantization parameter of the quantization decoding block to be decoded.

Any combinations of the above-mentioned components and implementations of the invention in the form of methods, devices, systems, recording media, and computer programs may also be effective as additional modes of the invention.

BRIEF DESCRIPTION OF THE DRAWINGS

FIG. 10 is a diagram illustrating an example of a difference quantization parameter encoding table;

DETAILED DESCRIPTION

The invention will now be described by reference to the preferred embodiments. This does not intend to limit the scope of the present invention, but to exemplify the invention.

An embodiment of the invention provides code amount control technique that derives an optimum prediction quantization parameter from the coding information of a plurality of encoded blocks, calculates a difference from the prediction quantization parameter, and encodes the difference, in order to reduce the amount of code of the quantization parameter of the block to be processed, in a picture encoding method which divides a picture into rectangular blocks with a predetermined size, further divides each rectangular block into one or a plurality of quantization coding blocks, which are management units of quantization parameters, and transmits a difference quantization parameter in units of the quantization coding blocks.

Embodiment 1

Figure 1:
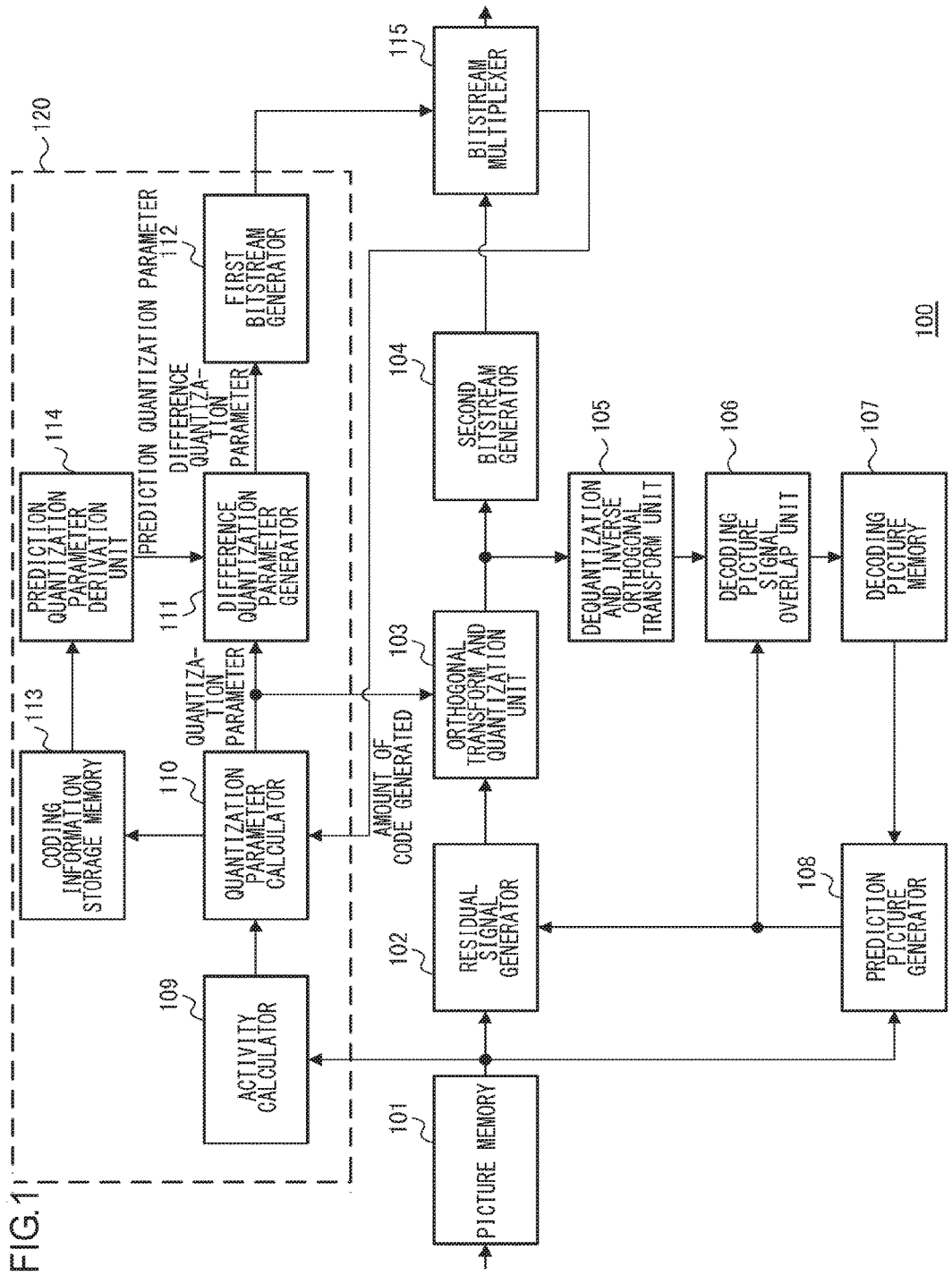
FIG. 1 is a block diagram illustrating the structure of a moving picture encoding device having a prediction quantization parameter derivation method according to an embodiment.

A moving picture encoding device 100 and a moving picture decoding device 200 according to preferred embodiments of the invention will be described. FIG. 1 is a block diagram illustrating the structure of the moving picture encoding device 100 according to the invention and includes a picture memory 101, a residual signal generator 102, an orthogonal transform and quantization unit 103, a second bitstream generator 104, a dequantization and inverse orthogonal transform unit 105, a decoding picture signal overlap unit 106, a decoding picture memory 107, a prediction picture generator 108, an activity calculator 109, a quantization parameter calculator 110, a difference quantization parameter generator 111, a first bitstream generator 112, a coding information storage memory 113, a prediction quantization parameter derivation unit 114, and a bitstream multiplexer 115. However, a thick solid arrow which connects blocks indicates the flow of a picture signal of a picture and a thin solid arrow indicates the flow of a parameter signal for controlling encoding.

The picture memory 101 temporarily stores the picture signal to be encoded which is supplied in order of imaging/display time. The picture memory 101 supplies the stored picture signal to be encoded to the residual signal generator 102, the prediction picture generator 108, and the activity calculator 109 in units of predetermined pixel blocks. At that time, the pictures which are stored in order of imaging/display time are arranged in order of encoding and are output in units of pixel blocks from the picture memory 101.

The residual signal generator 102 performs the subtraction between the picture signal to be encoded and a prediction signal generated by the prediction picture generator 108 to generate a residual signal and supplies the residual signal to the orthogonal transform and quantization unit 103.

The orthogonal transform and quantization unit 103 performs orthogonal transform and quantization on the residual signal using quantization parameters which are calculated by the quantization parameter calculator 110 to generate an orthogonally-transformed and quantized residual signal and supplies the residual signal to the second bitstream generator 104 and the dequantization and inverse orthogonal transform unit 105.

The second bitstream generator 104 performs entropy encoding on the orthogonally-transformed and quantized residual signal according to a prescribed syntax rule to generate a second bitstream and supplies the second bitstream to the bitstream multiplexer 115.

The dequantization and inverse orthogonal transform unit 105 performs dequantization and inverse orthogonal transform on the orthogonally-transformed and quantized residual signal supplied from the orthogonal transform and quantization unit 103 using the quantization parameters calculated by the quantization parameter calculator 110 to calculate the residual signal and supplies the residual signal to the decoding picture signal overlap unit 106.

The decoding picture signal overlap unit 106 overlaps the prediction picture signal generated by the prediction picture generator 108 and the residual signal which has been subjected to the dequantization and inverse orthogonal transform by the dequantization and inverse orthogonal transform unit 105 to generate a decoding picture and stores the decoding picture in the decoding picture memory 107. However, a filtering process may be performed on the decoding picture to reduce distortion, such as block distortion due to encoding, and the decoding picture may be stored in the decoding picture memory 107. In this case, prediction coding information, such as a flag for identifying the information of a host filter, for example, a deblocking filter, is stored in the coding information storage memory 113, if necessary.

The prediction picture generator 108 performs intra prediction or inter prediction on the basis of the picture signal supplied from the picture memory 101 and the decoding picture signal supplied from the decoding picture memory 107 in the prediction mode to generate a prediction picture signal. The intra prediction generates the prediction picture signal using the block to be encoded among the blocks which are obtained by dividing the picture signal supplied from the picture memory 101 into predetermined blocks and the pixel signal of the neighboring encoded block which is supplied from the decoding picture memory 107 and is neighboring to the block to be encoded in the same picture as that including the block to be encoded. The inter prediction uses, as a reference picture, the encoded picture, which is stored in the decoding picture memory 107 and is arranged before or after the block to be encoded among the blocks which are obtained by dividing the picture signal supplied from the picture memory 101 into predetermined blocks in time series in the picture (coding picture), performs block matching between the coding picture and the reference picture to calculate a motion vector indicating the amount of motion, and performs motion compensation from the reference picture on the basis of the amount of motion to generate the prediction picture signal. The generated prediction picture signal is supplied to the residual signal generator 102. Coding information, such as the motion vector obtained by the prediction picture generator 108, is stored in the coding information storage memory 113, if necessary. When a plurality of prediction modes can be selected, the prediction picture generator 108 evaluates, for example, the amount of distortion between the generated prediction picture signal and the original picture signal to determine the optimum prediction mode, selects the prediction picture signal which is generated by prediction in the determined prediction mode, and supplies the prediction picture signal to the residual signal generator 102. In addition, when the prediction mode is the intra prediction mode, the prediction picture generator 108 supplies the intra prediction mode to the coding information storage memory 113 and the first bitstream generator.

The activity calculator 109 calculates an activity which is a coefficient indicating the complexity or smoothness of the block to be encoded in the picture that is supplied from the picture memory 101 and supplies the activity to the quantization parameter calculator 110. The detailed structure and operation of the activity calculator 109 will be described below.

The quantization parameter calculator 110 calculates the quantization parameter of the block to be encoded using the activity calculated by the activity calculator 109 and supplies the quantization parameter to the difference quantization parameter generator 111 and the coding information storage memory 113. The detailed structure and operation of the quantization parameter calculator 110 will be described below.

The difference quantization parameter generator 111 subtracts the prediction quantization parameters derived by the prediction quantization parameter derivation unit 114 from the quantization parameter calculated by the quantization parameter calculator 110 to calculate a difference quantization parameter and supplies the difference quantization parameter to the first bitstream generator 112.

The first bitstream generator 112 encodes the difference quantization parameter calculated by the difference quantization parameter generator 111 according to a prescribed syntax rule to generate a first bitstream and supplies the first bitstream to the bitstream multiplexer 115.

The coding information storage memory 113 stores the quantization parameter of the encoded block. Although connection is not illustrated in FIG. 1, coding information, such as the prediction mode or the motion vector generated by the prediction picture generator 108, is also stored as information required to encode the next block to be encoded. In addition, coding information which is generated in units of pictures or slices is also stored, if necessary.

The prediction quantization parameter derivation unit 114 derives the prediction quantization parameter of the block to be subjected to quantization coding, using the quantization parameter of the encoded quantization coding block or the coding information, and supplies the prediction quantization parameter to the difference quantization parameter generator 111. The detailed structure and operation of the prediction quantization parameter derivation unit 114 will be described below.

The bitstream multiplexer 115 multiplexes the first bitstream and the second bitstream according to a prescribed syntax rule and outputs the multiplexed bitstream.

Figure 2:
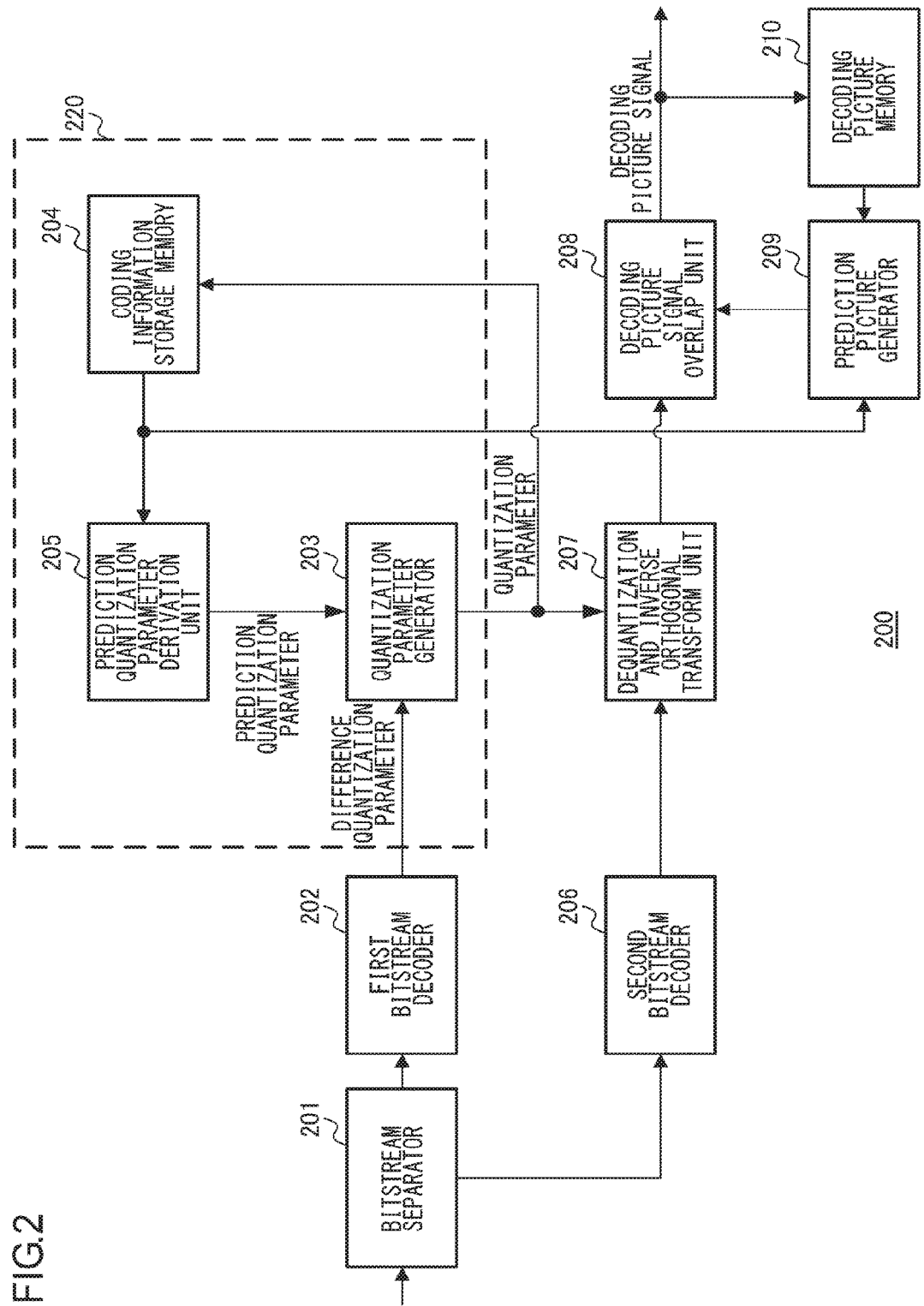
FIG. 2 is a block diagram illustrating the structure of a moving picture decoding device having the prediction quantization parameter derivation method according to the embodiment.

FIG. 2 is a block diagram illustrating the structure of the moving picture decoding device 200 according to the invention which corresponds to the moving picture encoding device 100 illustrated in FIG. 1. The moving picture decoding device 200 according to the embodiment includes a bitstream separator 201, a first bitstream decoder 202, a quantization parameter generator 203, a coding information storage memory 204, a prediction quantization parameter derivation unit 205, a second bitstream decoder 206, a dequantization and inverse orthogonal transform unit 207, a decoding picture signal overlap unit 208, a prediction picture generator 209, and a decoding picture memory 210. Similarly to the moving picture encoding device 100 illustrated in FIG. 1, a thick solid arrow which connects blocks indicates the flow of a picture signal of a picture and a thin solid arrow indicates the flow of a parameter signal for controlling encoding.

Since the decoding process of the moving picture decoding device 200 illustrated in FIG. 2 corresponds to the decoding process provided in the moving picture encoding device 100 illustrated in FIG. 1, the dequantization and inverse orthogonal transform unit 207, the decoding picture signal overlap unit 208, the prediction picture generator 209, the decoding picture memory 210, and the coding information storage memory 204 illustrated in FIG. 2 have functions corresponding to the functions of the dequantization and inverse orthogonal transform unit 105, the decoding picture signal overlap unit 106, the prediction picture generator 108, the decoding picture memory 107, and the coding information storage memory 113 of the moving picture encoding device 100 illustrated in FIG. 1, respectively. However, the prediction picture generator 209 does not have the motion vector detection function and the prediction mode selection function of the prediction picture generator 108 in the moving picture encoding device illustrated in FIG.

The bitstream supplied to the bitstream separator 201 is separated according to a prescribed syntax rule and the separated bitstream is supplied to the first bitstream decoder 202 and the second bitstream decoder 206.

The first bitstream decoder 202 decodes the supplied bitstream, outputs coding information related to, for example, the prediction mode, the motion vector, and the difference quantization parameter, gives the difference quantization parameter to the quantization parameter generator 203, and stores the coding information in the coding information storage memory 204.

The quantization parameter generator 203 adds the difference quantization parameter supplied from the first bitstream decoder 202 and the quantization parameter derived by the prediction quantization parameter derivation unit 205 to calculate a quantization parameter and supplies the quantization parameter to the dequantization and inverse orthogonal transform unit 207 and the coding information storage memory 204.

The coding information storage memory 204 stores the quantization parameter of the decoded quantization coding block. The coding information storage memory 204 stores the coding information which is generated in units of pictures or slices, in addition to the coding information of each block which is decoded by the first bitstream decoder 202, if necessary. Although connection is not illustrated in FIG. 2, the decoded coding information, such as the prediction mode or the motion vector, is supplied to the prediction picture generator 209.

The prediction quantization parameter derivation unit 205 derives a prediction quantization parameter using the quantization parameter of the decoded quantization coding block and supplies the prediction quantization parameter to the quantization parameter generator 203. The prediction quantization parameter derivation unit 205 has the same functions as the prediction quantization parameter derivation unit 114 of the moving picture encoding device 100 and the detailed structure and operation of the prediction quantization parameter derivation unit 205 will be described below.

The second bitstream decoder 206 decodes the supplied bitstream to calculate the orthogonally-transformed and quantized residual signal and supplies the orthogonally-transformed and quantized residual signal to the dequantization and inverse orthogonal transform unit 207.

The dequantization and inverse orthogonal transform unit 207 performs inverse orthogonal transform and dequantization on the orthogonally-transformed and quantized residual signal decoded by the second bitstream decoder 206 using the quantization parameter generated by the quantization parameter generator 203 to obtain an inverse-orthogonally-transformed and dequantized residual signal.

The decoding picture signal overlap unit 208 overlaps the prediction picture signal which is generated by the prediction picture generator 209 and the residual signal which is subjected to the inverse orthogonal transform and dequantization by the dequantization and inverse orthogonal transform unit 207 to generate a decoding picture signal, outputs the decoding picture signal, and stores the decoding picture signal in the decoding picture memory 210. When the decoding picture signal is stored in the decoding picture memory 210, a filtering process may be performed on the decoding picture to reduce distortion, such as block distortion due to encoding, and the decoding picture may be stored in the decoding picture memory 210.

The prediction picture generator 209 generates a prediction picture signal from the decoding picture signal supplied from the decoding picture memory 210, on the basis of the coding information, such as the prediction mode or the motion vector, decoded by the second bitstream decoder 206 and the coding information from the coding information storage memory 204 and supplies the prediction picture signal to the decoding picture signal overlap unit 208.

Next, a prediction quantization parameter derivation method which is commonly performed by some units 120 that are surrounded by a thick dotted line in the moving picture encoding device 100, particularly, the prediction quantization parameter derivation unit 114 and some units 220 that are surrounded by a thick dotted line in the moving picture decoding device 200, particularly, the prediction quantization parameter derivation unit 205 will be described in detail below.

First, the operation of each of some units 120 surrounded by the thick dotted line in the moving picture encoding device 100 according to this embodiment will be described. Some units 120 use a pixel block with a predetermined pixel size which is supplied from the picture memory 101 as a quantization coding block and determines the quantization parameter for quantizing the quantization coding block. The quantization parameter is mainly determined by an encoder side using code amount control and adaptive quantization algorithm and is transmitted to a decoder side that performs a quantization parameter prediction process. First, an adaptive quantization method of the activity calculator 109 will be described.

In general, the visual characteristics of the human eye are sensitive to a low-frequency component with a small edge. Therefore, the activity calculator 109 calculates an activity for achieving the complexity or smoothness of a picture in units of predetermined quantization coding blocks such that fine quantization is performed in a flat portion of the picture in which deterioration is likely to be visually conspicuous and rough quantization is performed in a complicated portion of the picture in which deterioration is relatively less likely to be conspicuous. However, the activity calculation process is included only in the encoding device, but is not included in the decoding device. Here, the activity is calculated for each quantization coding block. However, the invention is not limited thereto, but the encoder side may freely determine the unit of activity calculation, considering complexity.

For example, the activity is calculated by the variance value of a pixel in the coding block, which is described in MPEG-2 Test Model 5 (TM5). The variance value indicates the degree of dispersion of the value of a pixel forming the picture in the block from the average value. The variance value decreases as the flatness of a portion of the picture in the block increases (a change in brightness is reduced) and increases as the complexity of a portion of the picture increases (the change in brightness increases). Therefore, the variance value is used as the activity of the block. When a pixel value in the block is represented by p (x, y), the activity act of the block is calculated by the following expression.

$$\text{act} = \sum_{x,y \in \text{BLK}} (p(x,y) - p\_\text{mean})^2 \qquad \text{[Expression 1]}$$

Here, BLK indicates the total number of pixels in the quantization coding block and p_mean indicates the average value of the pixels in the block.

The activity is not limited to the variance. For example, the absolute values of the differences between the pixel in the quantization coding block and pixels which are neighboring to the pixel in the horizontal direction and the vertical direction and the sum of the absolute values in the block may be calculated. In this case, the value is small in a flat portion of the picture and is large in a complication portion of the picture with a large edge. The value can also be used as the activity. The activity is calculated by the following expression.

$$act = \sum_{x,y \in BLK}(p(x,y) - p(x+1,y) + p(x,y) - p(x,y+1)) \quad \text{[Expression 2] \#\#EQU00002\#\#}$$

The calculated activity act is supplied to the quantization parameter calculator 110.

Next, code amount control will be described. In the moving picture encoding device 100 according to this embodiment, particularly, a unit for achieving code amount control is not provided. In the following description, in the code amount control, the quantization parameter calculator 110 has code amount control function in order to determine the quantization parameter of the coding block, on the basis of the amount of code generated.

The code amount control is performed to approximate the generated code amount of a predetermined unit, such as a picture or a slice, to a target code amount. When it is determined that the generated code amount of the encoded block is more than the target code amount, rough quantization is relatively applied to the quantization coding block whose quantization parameter is to be encoded. When it is determined that the generated code amount of the encoded block is less than the target code amount, fine quantization is relatively applied to the block to be encoded.

Figure 3:
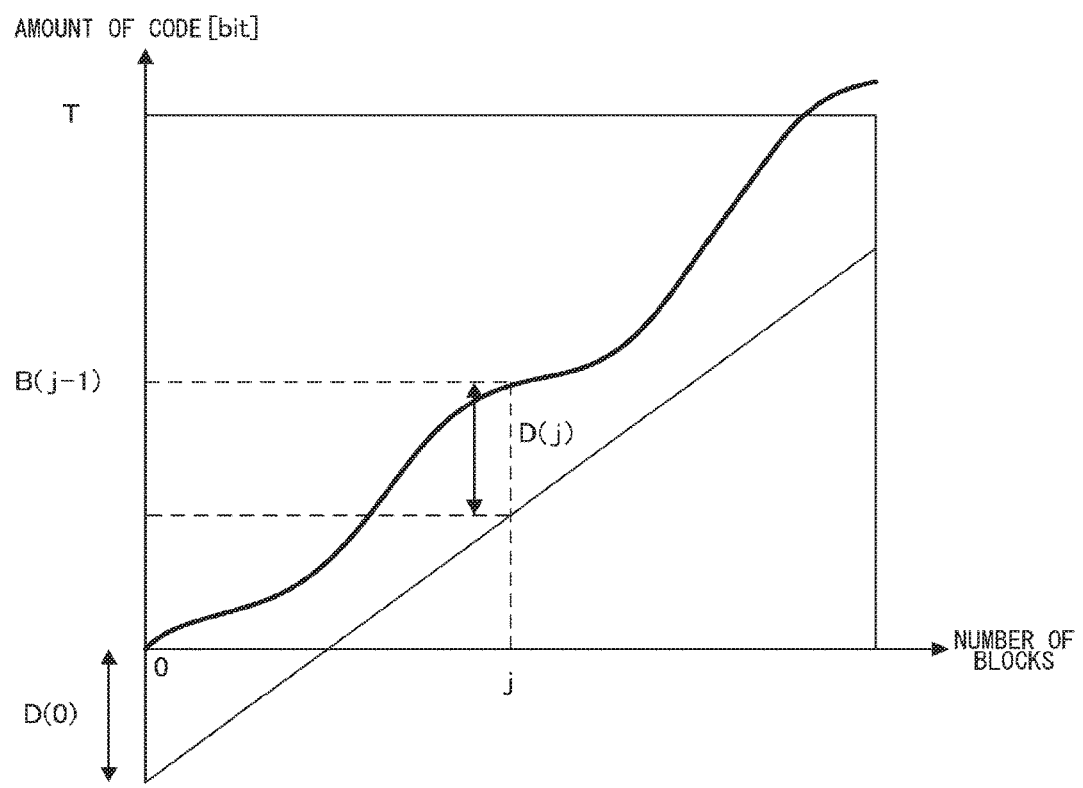
FIG. 3 is a diagram illustrating code amount control in an MPEG-2 TM5 screen.

The detailed code amount control algorithm will be described with reference to FIG. 3.

First, a target code amount (T) is determined for each picture. In general, the target code amount (T) is determined such that the following relationship is established: an I picture > a P picture > a reference B picture > a non-reference B picture. For example, in a case in which the target bit rate of a moving picture is 5 Mbps, the number of I pictures per second is 1, the number of P pictures per second is 3, the number of reference B pictures per second is 11, and the number of non-reference B pictures per second is 15, the target code amounts of picture types are Ti, Tp, Tbr, and Tb, when the target code amount is desired to be control such that Ti:Tp:Tbr:Tb=4:3:2:1 is established, Ti=400 kbit, Tp=300 kbit, Tbr=200 kbit, and Tb=100 kbit are established. However, the code amount allocated to each picture type does not have an effect on the essence of the invention.

Next, code amount control in the picture will be described. When the number of blocks, which are units determining the quantization parameters, is N, the generated code amount is B, and a difference bit between the target code amount and the generated code amount is D, the following expression is satisfied.

$$D(j) = D(0) + B(j-1) - T(j-1)/N \quad \text{[Expression 3] \#\#EQU00003\#\#}$$

Here, j indicates the encoding order count number of the quantization coding block. D(0) indicates the initial value of a target code amount difference.

A quantization parameter bQP is determined by code amount control as follows.

$$bQP(j) = D(j) \cdot r \quad \text{[Expression 4]}$$

Here, r indicates a proportional coefficient for converting the target code amount difference into a quantization parameter. The proportional coefficient r is determined according to usable quantization parameters.

The quantization parameter calculator 110 changes the quantization parameter of the coding block calculated by the code amount control, using the activity act which is calculated for each quantization coding block by the activity calculator 109. Hereinafter, since the quantization parameter is calculated for each quantization coding block, it is assumed that the encoding order count number of the quantization parameter by the code amount control is removed and the quantization parameter is represented by bQP.

The quantization parameter calculator 110 records the average activity of the previous encoded picture as avg_act and calculates the normalized activity Nact of the coding block using the following expression.

$$Nact = \frac{2 \cdot act + avg\_act}{act + 2 \cdot avg\_act} \quad \text{[Expression 5] \#\#EQU00004\#\#}$$

In the above-mentioned expression, the coefficient "2" is a value indicating the dynamic range of the quantization parameter and a normalized activity Nact is calculated in the range of 0.5 to 2.0. However, the coefficient of the quantization parameter is not limited to 2, but may be other values depending on, for example, the characteristics of the picture.

For avg_act, the activity may be calculated for all blocks in the picture in advance before the encoding process and the average value of the activities may be calculated as avg_act. In addition, avg_act may be stored in the coding information storage memory 113 or the quantization parameter calculator 110 may acquire avg_act from the coding information storage memory 113, if necessary.

The calculated normalized activity Nact is multiplied by the quantization parameter bQP which is a reference parameter to obtain a quantization parameter QP of the coding block, as represented by the following expression.

$$QP = Nact \cdot bQP \quad \text{[Expression 6]}$$

The calculated quantization parameter of the coding block is supplied to the coding information storage memory 113 and the difference quantization parameter generator 111.

The coding information storage memory 113 stores the quantization parameter calculated by the quantization parameter calculator 110 or the quantization parameter of the past encoded quantization coding block and coding information, such as the motion vector of the coding block or the prediction mode. Each unit derives the coding information, if necessary.

The prediction quantization parameter derivation unit 114 derives the prediction quantization parameter which is required to efficiently encode the quantization parameter of the coding block and to transmit the quantization parameter, using the encoded quantization parameter from the coding information storage memory 113.

A method which calculates the difference (difference quantization parameter) between the quantization parameter and the prediction quantization parameter which is predicted from the quantization parameter of the encoded quantization coding block, encodes the difference quantization parameter, and transmits the difference quantization parameter is more efficient in encoding and transmitting the quantization parameter than a method which transmits the quantization parameter without any change. In terms of code amount control, when the quantization parameter of the previous encoded block in order of encoding is used as the prediction quantization parameter, the value of the difference quantization parameter to be transmitted is reduced and the amount of code is reduced. In contrast, in terms of adaptive quantization, since a quantization coding block generally has a similar pattern to a neighboring quantization coding block, the activity of the neighboring quantization coding block close to the quantization coding block is approximate to the activity of the coding block.

Figure 4:
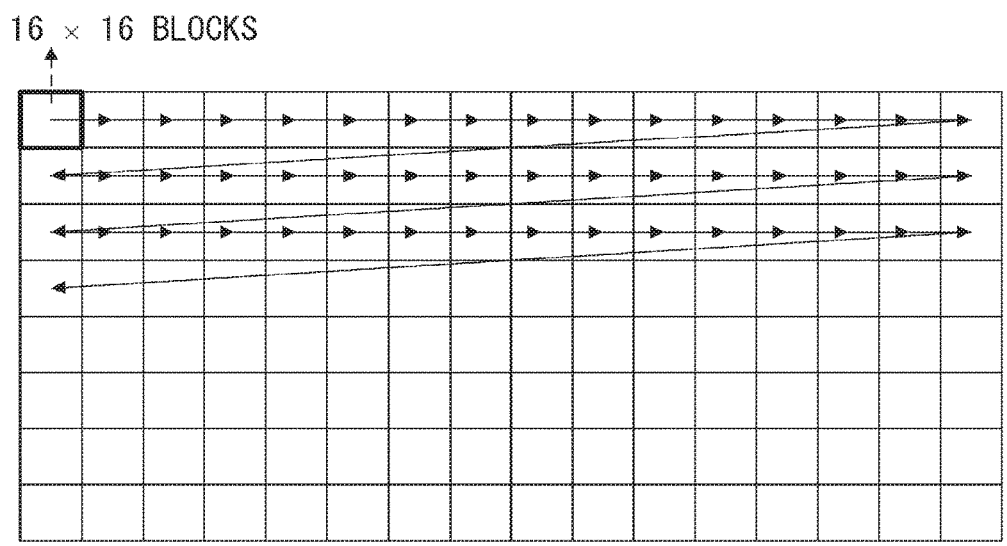
FIG. 4 is a diagram illustrating a quantization parameter prediction method in AVC.

When the quantization parameter of the neighboring quantization coding block is used as the prediction quantization parameter, the value of the difference quantization parameter to be transmitted is reduced and the amount of code is reduced. Therefore, in AVC, a method is used in which the transmission unit of the quantization parameter is fixed to a macro block (a 16.times.16 pixel group), the quantization parameter of the neighboring block which is arranged on the left side of the coding block and is encoded immediately before the coding block in a raster scanning order is used as the prediction quantization parameter, the difference between the quantization parameter of the coding block and the prediction quantization parameter is calculated, and the difference quantization parameter is encoded and transmitted, as illustrated in FIG. 4. That is, AVC is most suitable for the prediction of the quantization parameter by the code amount control. However, in AVC, hierarchical tree encoding, which will be described below, is not performed. Therefore, in a portion of the picture other than the left end, since the previous block is the left block, the quantization parameter of a neighboring block is used as the prediction quantization parameter and AVC is substantially most suitable for prediction using adaptive quantization. Thus, as in the structure, such as AVC, in which the transmission unit of the quantization parameter is fixed and hierarchical tree encoding is not performed, the previous encoded block is also most suitable for the prediction of the quantization parameter.

However, in the case in which the hierarchical tree encoding is performed, when the quantization parameter of the previous block is used as the prediction quantization parameter similarly to AVC, prediction which is most suitable for code amount control is performed. However, when the quantization parameter is transmitted using adaptive quantization, there is a problem that an optimum prediction value is not obtained and the amount of code of the difference quantization parameter increases.

Here, the hierarchical tree encoding will be described. The hierarchical tree encoding determines a depth indicating the unit of encoding in each tree block (here, 64.times.64 blocks) and performs quantization coding for each coding block at the determined depth. In this way, it is possible to determine the optimum depth which depends on the definition of the picture and to perform quantization coding at the determined optimum depth. Therefore, encoding efficiency is significantly improved.

Figure 5:
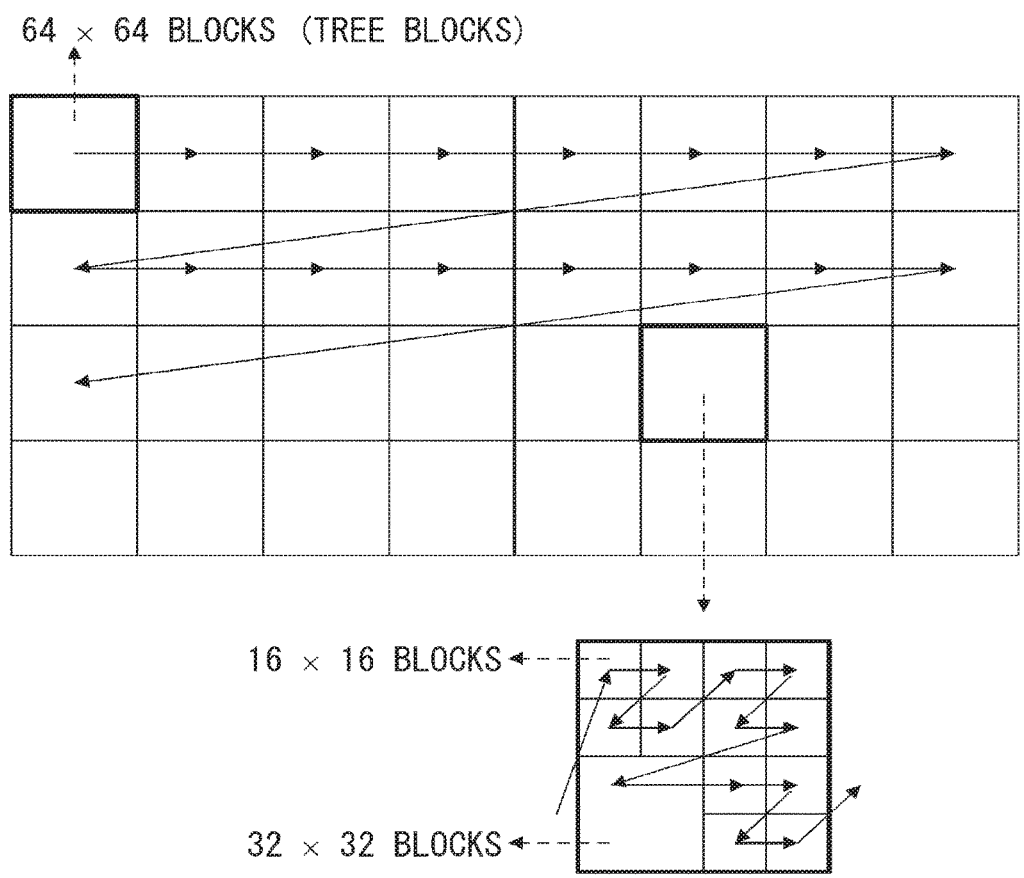
FIG. 5 is a diagram illustrating an example of the order of an encoding process when hierarchical tree encoding is used.

FIG. 5 illustrates the encoding order of a hierarchical tree encoding structure. As illustrated in the upper diagram of FIG. 5, a screen is equally divided into square units with the same size. The unit is called a tree block and is the basic unit of address management for specifying an encoding/decoding block in the picture. The tree block can be hierarchically divided into four small blocks, depending on, for example, texture in the picture, in order to optimize the encoding process, if necessary. The hierarchical block structure formed by dividing the tree block into small blocks is referred to as a tree block structure and the divided block is referred to as a coding block (CU) and is the basic unit of processing when encoding and decoding are performed. The lower diagram of FIG. 5 illustrates an example in which, among four CUs divided from the tree block, each of three CUs except for the lower left CU is further divided into four blocks.

In this embodiment, it is assumed that the CU and the quantization coding block are set to the same unit, that, the quantization parameter is set for each CU. The tree block is the coding block with the maximum size. However, the unit of the quantization coding block may not be the same as the CU, but may be a predetermined independent unit. That is, the quantization coding block does not depend on the size of the CU, but may be fixed to a 16.times.16 block unit. Next, an example in which the unit of the quantization coding block is not the same as the CU will be described.

Figure 6:
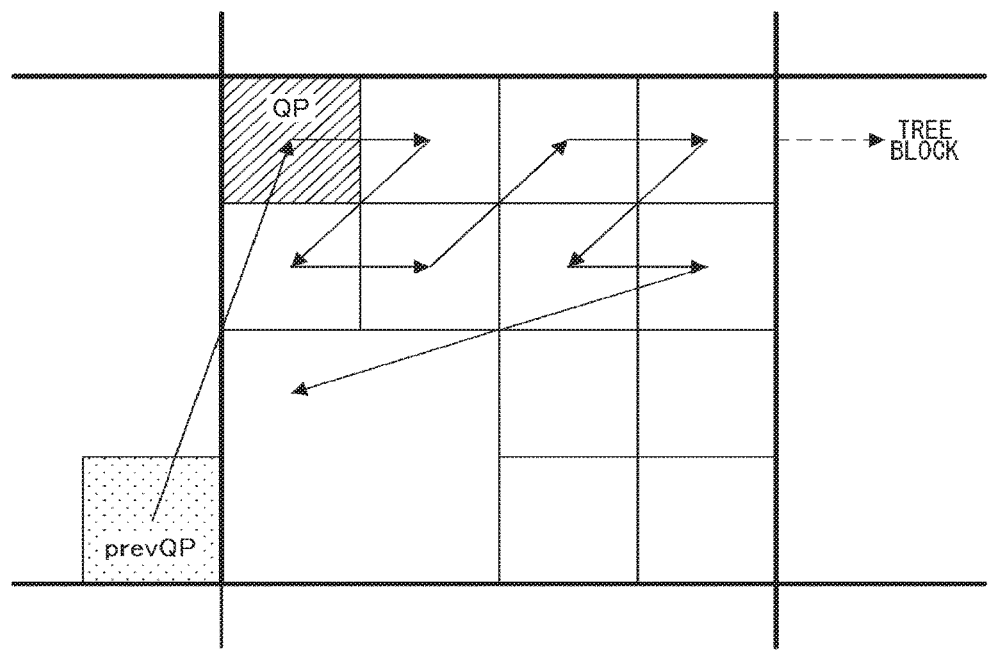
FIG. 6 is a diagram illustrating an example of the prediction of a quantization parameter of the upper left quantization coding block in a tree block which is divided by the hierarchical tree encoding.
Figure 7:
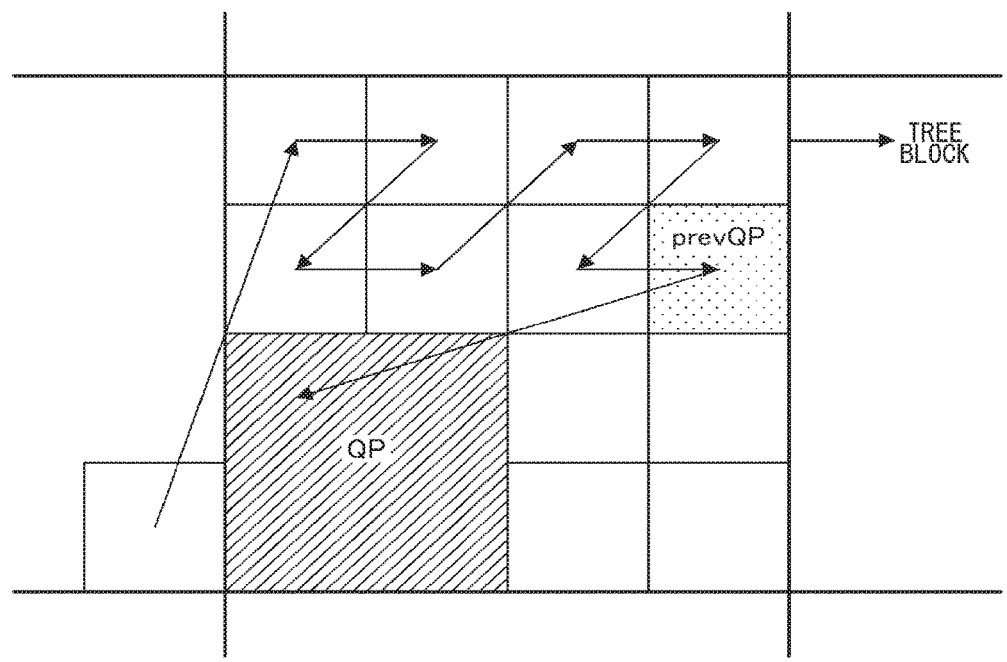
FIG. 7 is a diagram illustrating an example of the prediction of a quantization parameter of the lower left quantization coding block in the tree block which is divided by the hierarchical tree encoding.

In the hierarchical tree encoding, since the order of encoding is different from the raster scanning order (from the left to the right) as in AVC illustrated in FIG. 4, in many cases, the quantization parameter of the previous encoded block is not the same as that of the left neighboring block. In an example of the hierarchical tree encoding, as illustrated in FIG. 6, the upper left quantization coding block (a hatched rectangle in FIG. 6) in the tree block to be encoded uses the quantization parameter of the lower right encoded block (a gray rectangle in FIG. 6), which has been encoded last among the blocks divided from the tree block that is neighboring on the left side of the tree block to be encoded, for prediction. In addition, as illustrated in FIG. 7, the lower left quantization coding block (a hatched rectangle in FIG. 7) in the tree block to be encoded uses the quantization parameter of the block (a gray rectangle in FIG. 7), which is divided from the same tree block and is previously quantized and encoded, for prediction. Therefore, when the quantization parameter is predicted only from the previous encoded block, prediction which is most suitable for code amount control can be performed, but it is difficult to perform prediction suitable for adaptive quantization since there is a gap between the divided blocks. As a result, the amount of code of the difference quantization parameter increases and encoding efficiency is reduced.

Figure 8:
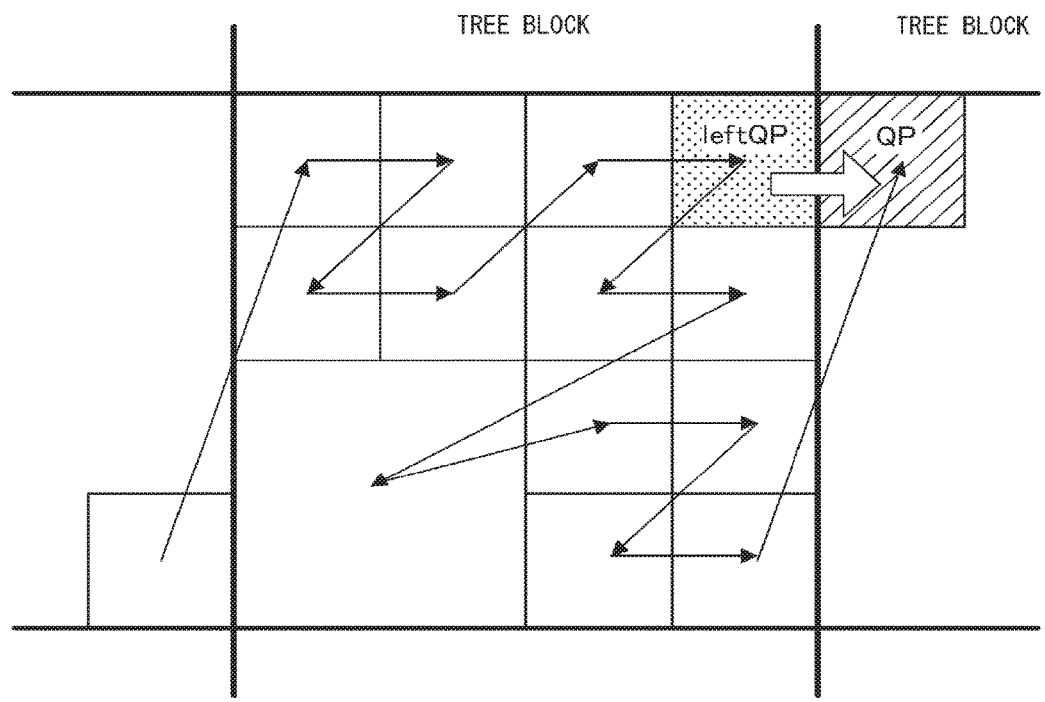
FIG. 8 is a diagram illustrating an example of the prediction of the quantization parameter of the upper left quantization coding block in the tree block which is divided by the hierarchical tree encoding.

When the quantization parameter of the left neighboring quantization coding block is constantly used as the prediction quantization parameter, as illustrated in FIG. 8, the prediction quantization parameter of the upper left quantization coding block in the tree block is further away from that of the quantization coding block in the previous tree block as the number of quantization coding blocks divided from the previous tree block increases. Therefore, encoding efficiency is reduced in terms of code amount control in which the prediction efficiency of the quantization parameter increases as the prediction is performed from the closer quantization coding block in order of encoding.

Figure 9:
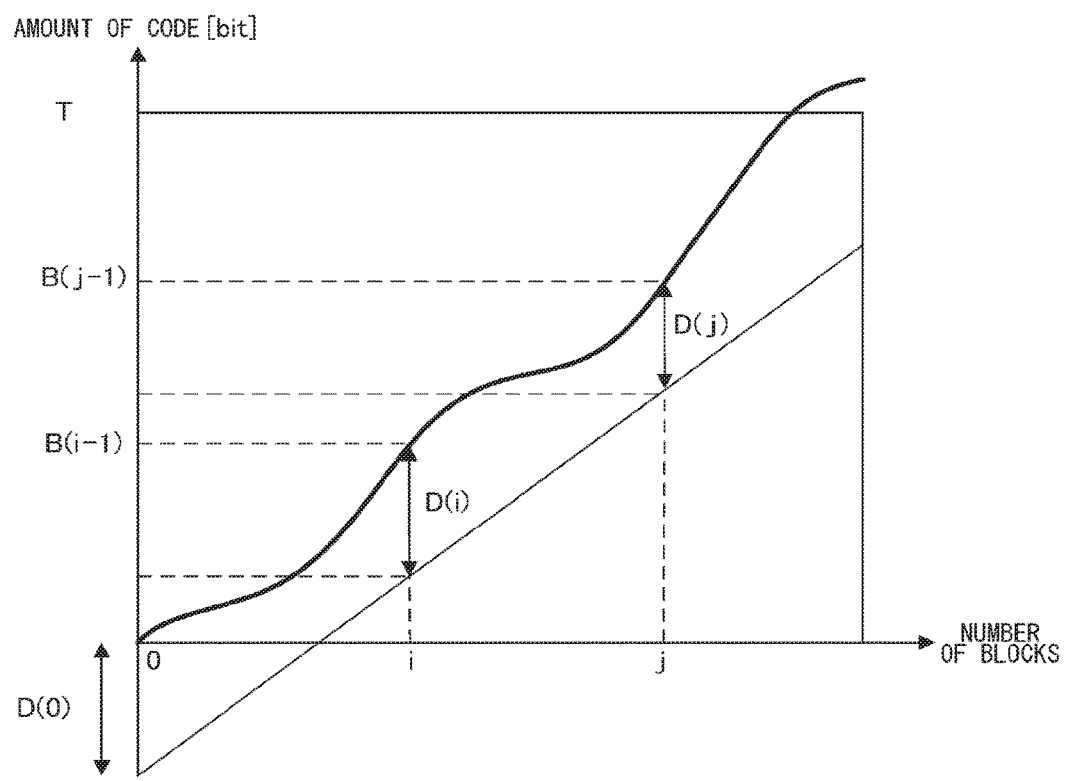
FIG. 9 is a diagram illustrating the position of coding blocks which are neighboring in the vertical direction in code amount control in the MPEG-2 TM5 screen.

That is, when the quantization parameter is predicted from the spatially neighboring quantization coding block, in some cases, the quantization parameter which was calculated long before the quantization coding block is used. Therefore, as illustrated in FIG. 9, for the processing order j of the quantization coding block and the processing order i of the spatially neighboring quantization coding block, even when the quantization coding blocks are spatially neighboring to each other, i«j is satisfied in order of encoding in terms of code amount control, as illustrated in FIG. 9. Therefore, there is a high correlation between the quantization parameters of the neighboring quantization coding blocks. In addition, when the quantization parameter is predicted only from the quantization coding blocks which are close in order of encoding among the spatially quantization coding blocks, it is determined whether the spatially neighboring quantization coding block is out of the tree block. When the spatially neighboring quantization coding block is out of the tree block, it is determined that the spatially neighboring quantization coding block is the quantization coding block which is away in order of encoding and only the quantization parameter in the tree block is used for prediction. Therefore, it is possible to avoid the derivation of an improper quantization parameter in terms of code amount control. However, in some cases, the optimum process is not necessarily performed in terms of code amount control. For example, a process is required which determines whether the spatially neighboring quantization coding block, which is the prediction unit of the quantization parameter, is out of the tree block, or the quantization coding block is disposed in the tree block, but is not away in order of encoding.

Here, the prediction quantization parameter derivation unit 114 according to the embodiment of the invention derives the prediction quantization parameter using the quantization parameters of a plurality of previous quantization coding blocks. Therefore, a method is achieved which can predict the quantization parameters from the spatially neighboring quantization coding blocks which have high prediction efficiency in terms of adaptive quantization, while using the quantization parameters of quantization coding blocks which are close to each other in order of encoding and have high prediction efficiency in terms of code amount control. In addition, the storage of the quantization parameters for deriving the spatially neighboring quantization parameters is minimized and the quantization parameter is predicted with a small amount of memory. The prediction quantization parameter derivation unit 114 will be described in detail below.

The difference quantization parameter generator 111 performs the subtraction between the quantization parameter of the quantization coding block calculated by the quantization parameter calculator 110 and the prediction quantization parameter derived by the prediction quantization parameter derivation unit 114 to calculate a difference quantization parameter. The prediction quantization parameter is derived from the decoded quantization coding block during decoding by the same method as that during encoding. When the difference encoding parameter is encoded, there is no inconsistency between encoding and decoding and it is possible to reduce the amount of code of the quantization parameter. The calculated difference quantization parameter is supplied to the first bitstream generator 112.

The first bitstream generator 112 performs entropy encoding on the difference quantization parameter calculated by the difference quantization parameter generator 111 according to a prescribed syntax rule to generate the first bitstream. FIG. 10 illustrates an example of an encoding conversion table which is used to perform entropy encoding on the difference quantization parameter. In the table, for example, a first bit indicates that a difference quantization parameter with the highest frequency of appearance is 0, a second bit indicates a positive flag, a third bit indicates whether the absolute value of the difference quantization parameter is 1, and a fourth bit indicates whether the absolute value of the difference quantization parameter is 2. In the encoding of the difference quantization parameter, a shorter code length is given to the difference quantization parameter with a smaller absolute value and the absolute value of the difference quantization parameter is known by the bit length. Therefore, it is possible to suppress the generated code amount of the difference quantization parameter with a simple structure. FIG. 10 illustrates the encoding table in which the bit length increases in proportion to the absolute value of the difference quantization parameter. Therefore, when a small difference quantization parameter is transmitted, the generated code amount is significantly reduced. When a large difference quantization parameter is transmitted, the generated code amount is relatively large. When the difference quantization parameter is encoded using the encoding table illustrated in FIG. 10, it is important not only to improve the probability of the difference quantization parameter being zero, but also to derive the prediction quantization parameter which minimizes the generation of a difference quantization parameter with a large value. The first bitstream generator 112 extracts a bitstream corresponding to the difference quantization parameter from FIG. 10 and supplies the bitstream to the bitstream multiplexer 115.

The operation of each of some units 220 which are surrounded by a thick dotted line in the moving picture decoding device 200 corresponding to the moving picture encoding device 100 according to this embodiment will be described.

In some units 220, first, the difference quantization parameter decoded by the first bitstream decoder 202 is supplied to the quantization parameter generator 203. In addition, coding information other than the difference quantization parameter is stored in the coding information storage memory 204, if necessary.

The quantization parameter generator 203 adds the difference quantization parameter supplied from the first bitstream decoder 202 and the quantization parameter derived by the prediction quantization parameter derivation unit 205 to calculate the quantization parameter of a decoding block and supplies the calculated quantization parameter to the dequantization and inverse orthogonal transform unit 207 and the coding information storage memory 204.

The coding information storage memory 204 stores the quantization parameter of the decoded quantization coding block. In addition, the coding information storage memory 204 stores coding information which is generated for each picture or slice as well as the coding information of each block which is decoded by the first bitstream decoder 202, if necessary.

The prediction quantization parameter derivation unit 205 derives the prediction quantization parameter using the quantization parameter of the decoded block and supplies the prediction quantization parameter to the quantization parameter generator 203. The quantization parameter calculated by the quantization parameter generator 203 is stored in the coding information storage memory 204 and is used to derive the prediction quantization parameter of the quantization coding block to be decoded in the subsequent process. The decoded quantization parameter is the same as the quantization parameter which is derived from the coding information storage memory 113 by the prediction quantization parameter derivation unit 114 of the moving picture encoding device 100. The prediction quantization parameter derivation unit 205 has the same functions as the prediction quantization parameter derivation unit 114 of the moving picture encoding device 100. Therefore, when the same quantization parameter is supplied from the coding information storage memory 204, the prediction quantization parameter derivation unit 205 derives the same prediction quantization parameter as that during encoding.

The prediction quantization parameter which is derived by the encoder side is derived on the decoder side without any inconsistency.

Next, a prediction quantization parameter derivation method which is commonly performed by the prediction quantization parameter derivation units 114 and 205 will be described in detail.

Figure 11:
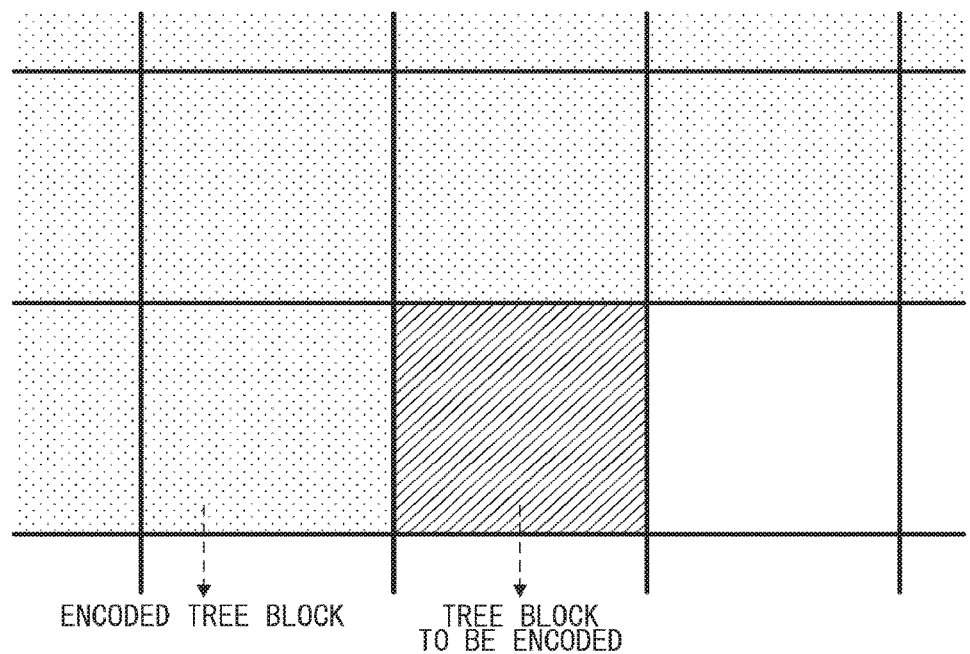
FIG. 11 is a diagram illustrating the relationship between the tree block to be encoded and the encoded tree block.

The detailed operation of the prediction quantization parameter derivation unit 114 will be described. As illustrated in FIG. 11, encoding is performed for each tree block in a raster scanning order from the upper left side to the lower right side of the screen. When the tree block to be encoded is represented by a hatched rectangle in FIG. 11, the encoded tree block is represented by a gray portion in FIG. 11. In the tree block, hierarchical tree encoding is performed according to encoding conditions and the coding block is divided with a size that is less than or equal to that of the tree block. The coding block in the tree block to be encoded is neighboring to the encoded block in a tree block that is disposed above the tree block to be encoded, but the coding block and the encoded block are greatly separated from each other in order of encoding. Therefore, since the quantization parameter is calculated by code amount control in order of encoding, the quantization parameter of the coding block is not close to the quantization parameter of the encoded block in the tree block which is disposed above the tree block to be encoded. For this reason, the prediction quantization parameter is encoded using the quantization parameters of a plurality of previous quantization coding blocks.

FIGS. 12 to 15 illustrate the prediction source of the upper left, upper right, lower left, and lower right quantization coding blocks which are divided from the tree block by hierarchical tree encoding.

Figure 12:
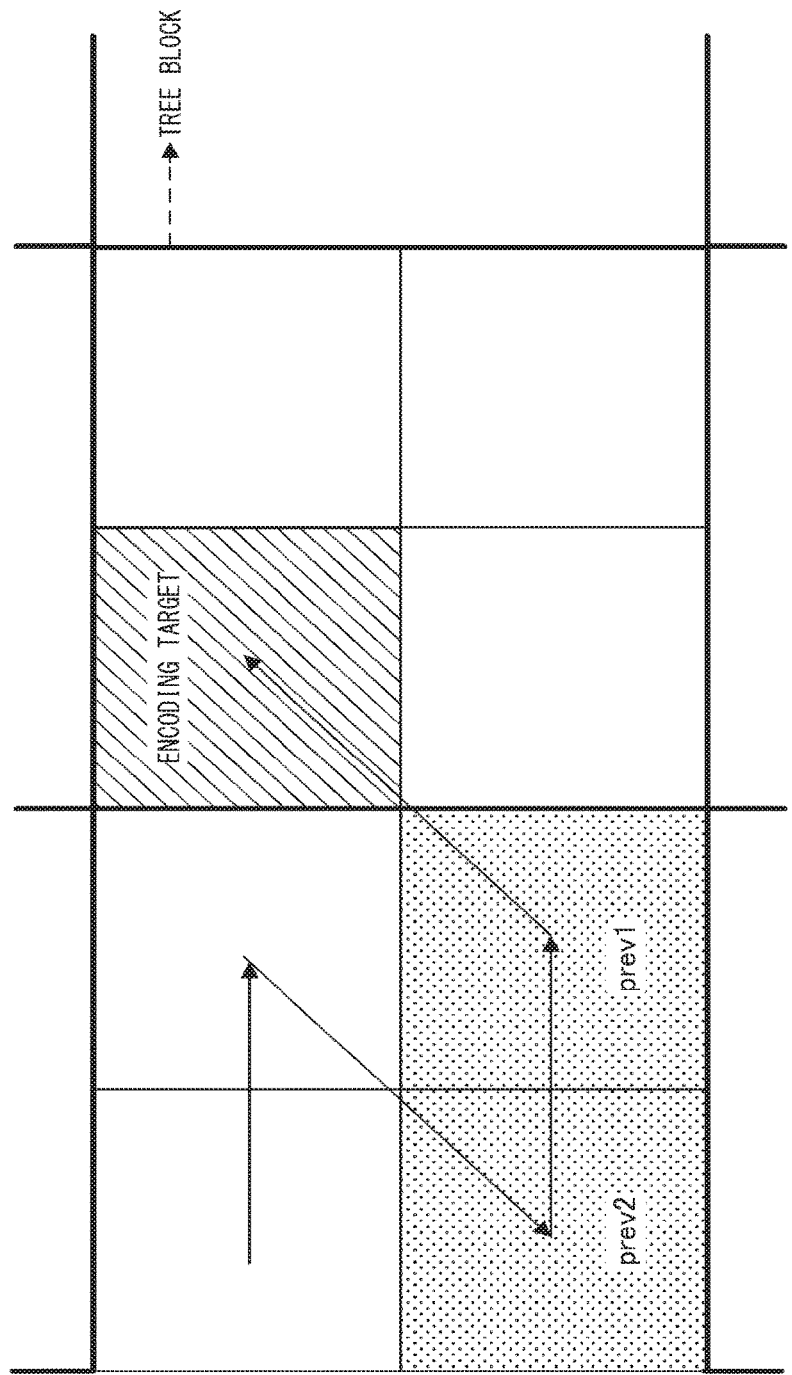
FIG. 12 is a diagram illustrating the prediction source of the upper left quantization coding block in the tree block divided by the hierarchical tree encoding.

In the upper left quantization coding block in the tree block illustrated in FIG. 12, a quantization parameter prevQP1 of a previous quantization coding block in order of encoding and a quantization parameter prevQP2 of a quantization coding block before the previous quantization coding block in order of encoding are derived from two quantization coding blocks in a previous tree block, respectively.

Figure 13:
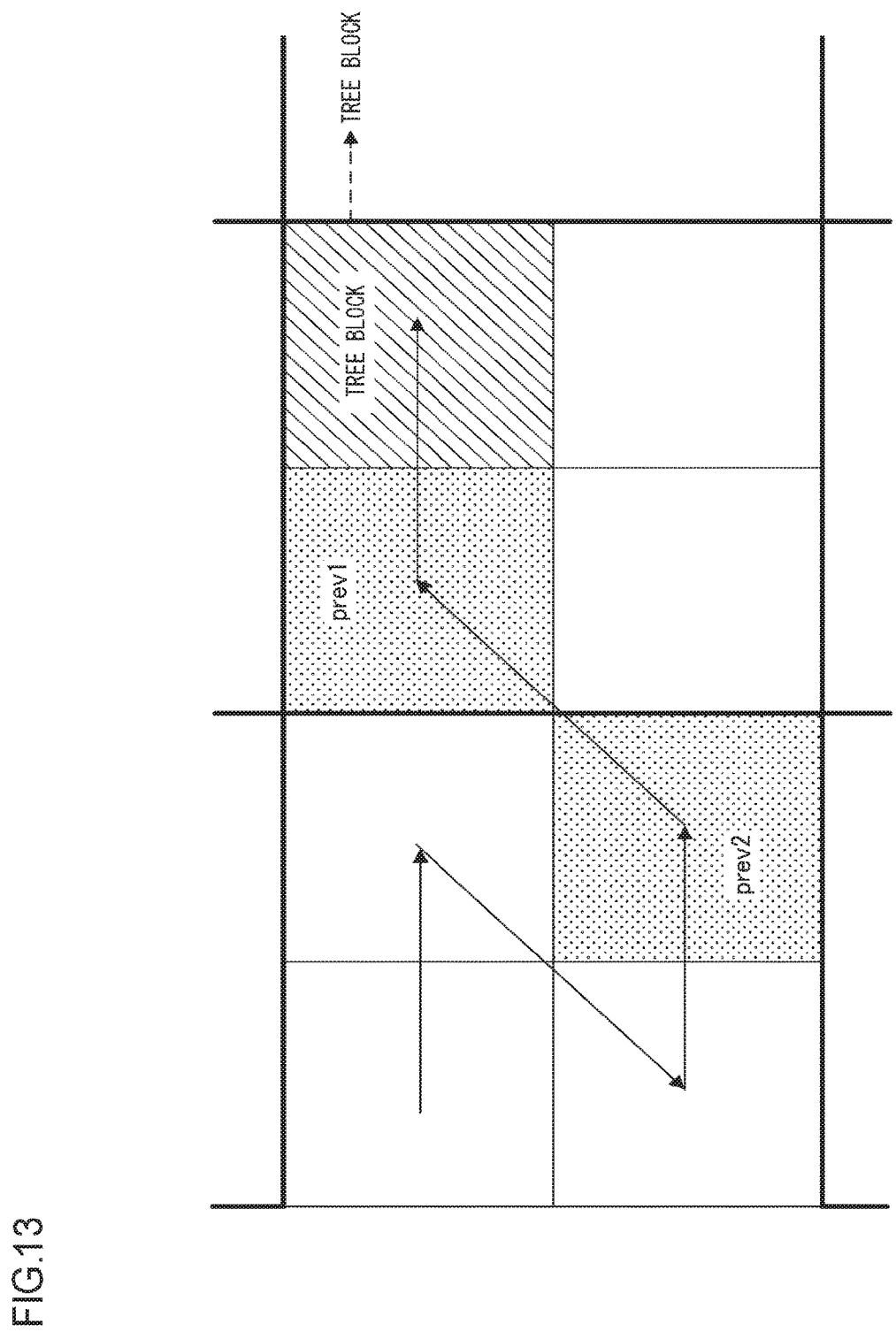
FIG. 13 is a diagram illustrating the prediction source of the upper right quantization coding block in the tree block divided by the hierarchical tree encoding.

In the right quantization coding block in the tree block illustrated in FIG. 13, the quantization parameter prevQP1 of the previous quantization coding block in order of encoding and the quantization parameter prevQP2 of the quantization coding block before the previous quantization coding block in order of encoding are derived from the left quantization coding block in the same tree block and one quantization coding block in the previous tree block, respectively.

Figure 14:
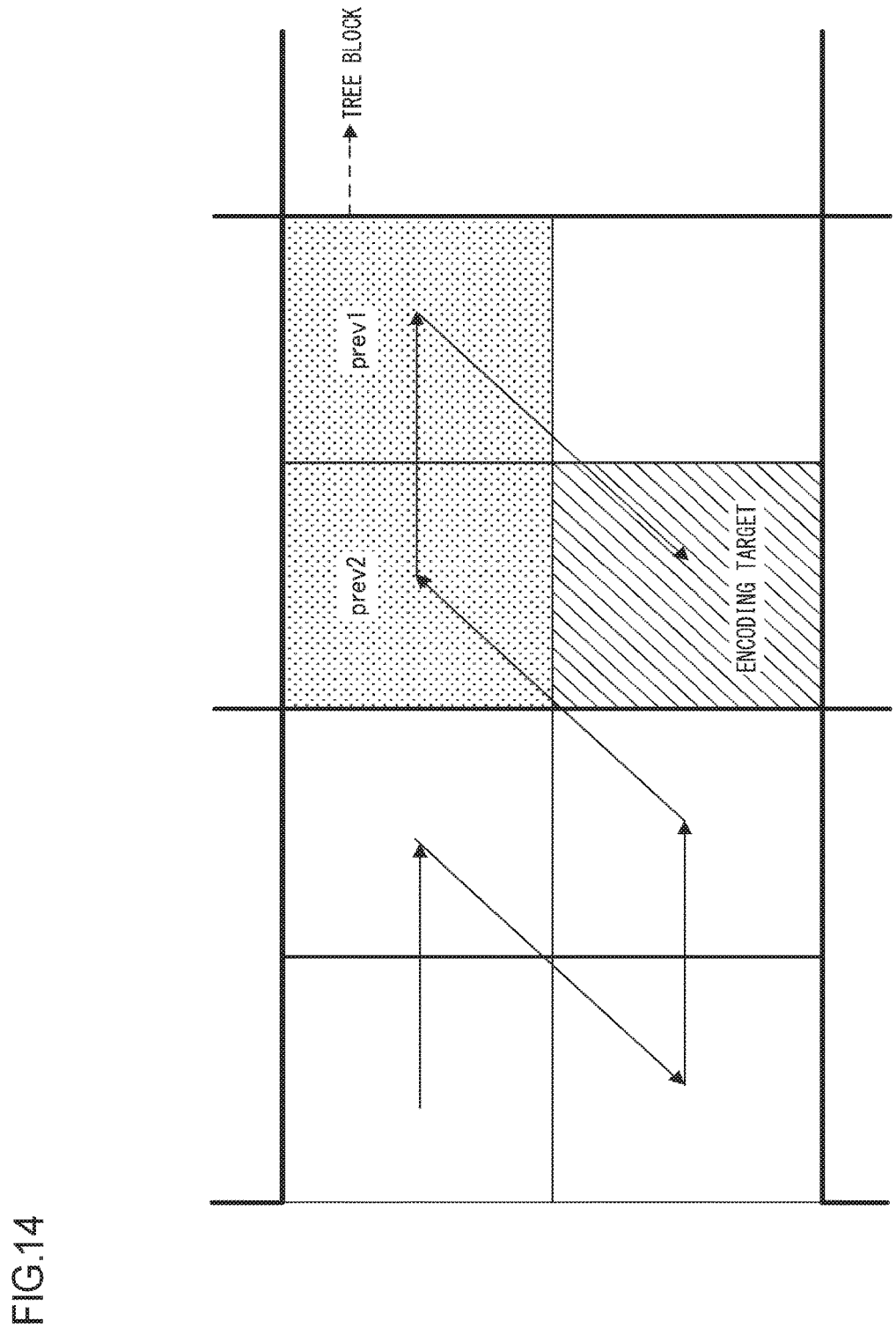
FIG. 14 is a diagram illustrating the prediction source of the lower left quantization coding block in the tree block divided by the hierarchical tree encoding.

In the lower left quantization coding block in the tree block illustrated in FIG. 14, the quantization parameter prevQP1 of the previous quantization coding block in order of encoding and the quantization parameter prevQP2 of the quantization coding block before the previous quantization coding block in order of encoding are derived from the upper right quantization coding block and the upper quantization coding block in the same tree block, respectively.

Figure 15:
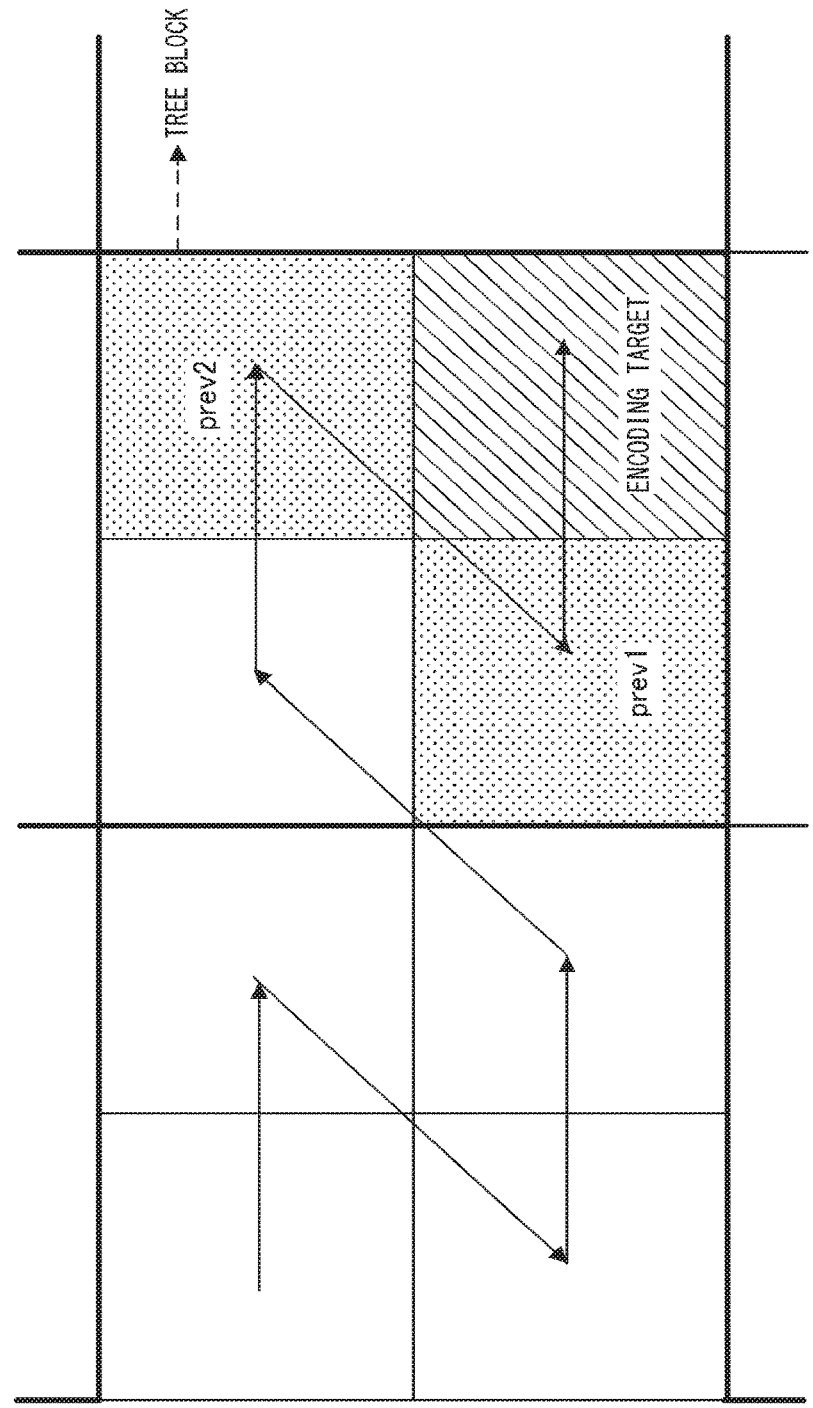
FIG. 15 is a diagram illustrating the prediction source of the lower right quantization coding block in the tree block divided by the hierarchical tree encoding.

In the lower right quantization coding block in the tree block illustrated in FIG. 15, the quantization parameter prevQP1 of the previous quantization coding block in order of encoding and the quantization parameter prevQP2 of the quantization coding block before the previous quantization coding block in order of encoding are derived from the left right quantization coding block and the upper quantization coding block in the same tree block, respectively.

The prediction quantization parameter is determined by the average value of prevQP1 and prevQP2.

$$predQP = prevQP1 + prevQP2 + 12 \quad \text{[Expression 7] ##EQU00005##}$$

In the examples illustrated in FIGS. 12 and 13, the quantization coding blocks which are spatially separated from each other are the prediction source of the quantization parameters and the average value of the quantization parameters is calculated. Therefore, even when the quantization parameter prevQP1 has low reliability due to an unexpected factor, errors are averaged and the prediction efficiency of the quantization parameter is improved. Even though the quantization coding blocks which are spatially separated from each other are used, the average value of a plurality of prediction quantization parameters is used for the following reason. When the difference quantization parameter encoding table illustrated in FIG. 10 is used, it is important to derive the prediction quantization parameter which can minimize the generation of the difference quantization parameter with a large value. In this case, the effect of averaging the errors is particularly noticeable.

In the examples illustrated in FIGS. 14 and 15, since the quantization coding blocks which are spatially neighboring to each other are the prediction source of the quantization parameters, the improvement of the prediction efficiency of the quantization parameters is particularly noticeable. That is, it is possible to predict the quantization parameters from the quantization coding blocks which are neighboring to each other both in order of encoding and spatially and quantization parameter prediction suitable for both code amount control and adaptive quantization is performed.

As such, when the prediction quantization parameter is derived using the quantization parameters of a plurality of previous quantization coding blocks, it is possible to predict the quantization parameters from the spatially neighboring quantization coding blocks which have high prediction efficiency in terms of adaptive quantization, while using the quantization parameters of quantization coding blocks which are close in order of encoding and have high prediction efficiency in terms of code amount control. Therefore, the amount of code of the difference quantization parameter is suppressed and encoding efficiency is improved.

Figure 16:
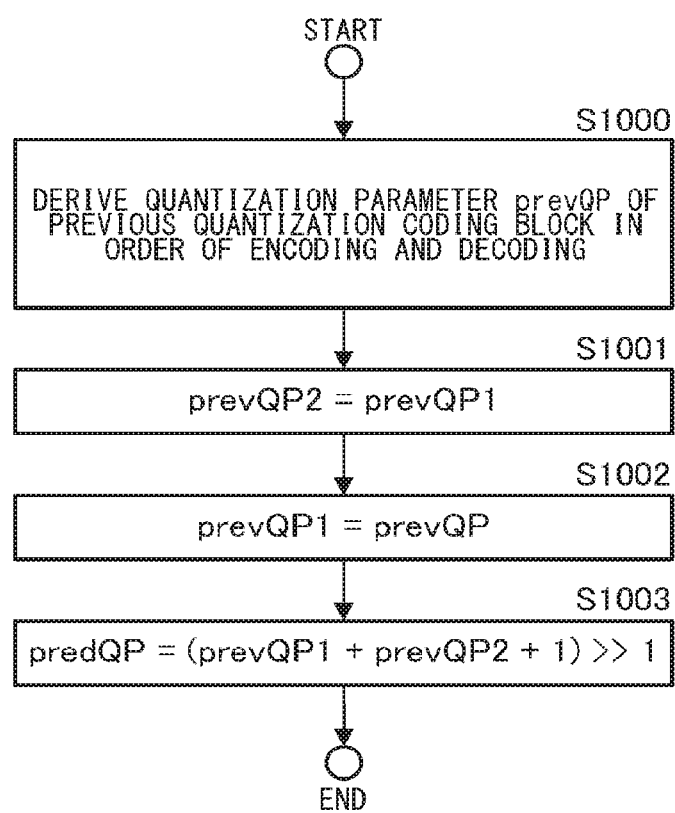
FIG. 16 is a flowchart illustrating the derivation of a prediction quantization parameter.

FIG. 16 is a flowchart illustrating a prediction quantization parameter derivation process. First, the quantization parameter prevQP of the previous quantization coding block in order of encoding and decoding is derived (S1000). Then, prevQP1 in which the value of the quantization parameter of the previous quantization coding block is stored is substituted into prevQP2 in which the value of the quantization parameter of a quantization coding block before the previous quantization coding block is stored (S1001). Then, the quantization parameter prevQP of the previous quantization coding block acquired in S100 is substituted into prevQP1 in which the value of the quantization parameter of the previous quantization coding block is stored (S1002). Finally, the average value of prevQP1 and prevQP2 is calculated and is used as the prediction quantization parameter (S1003).

At the head of a picture or a slice, prevQP1 and prevQP2 are initialized by a slice QP which is described in, for example, a slice header.

Figure 17:
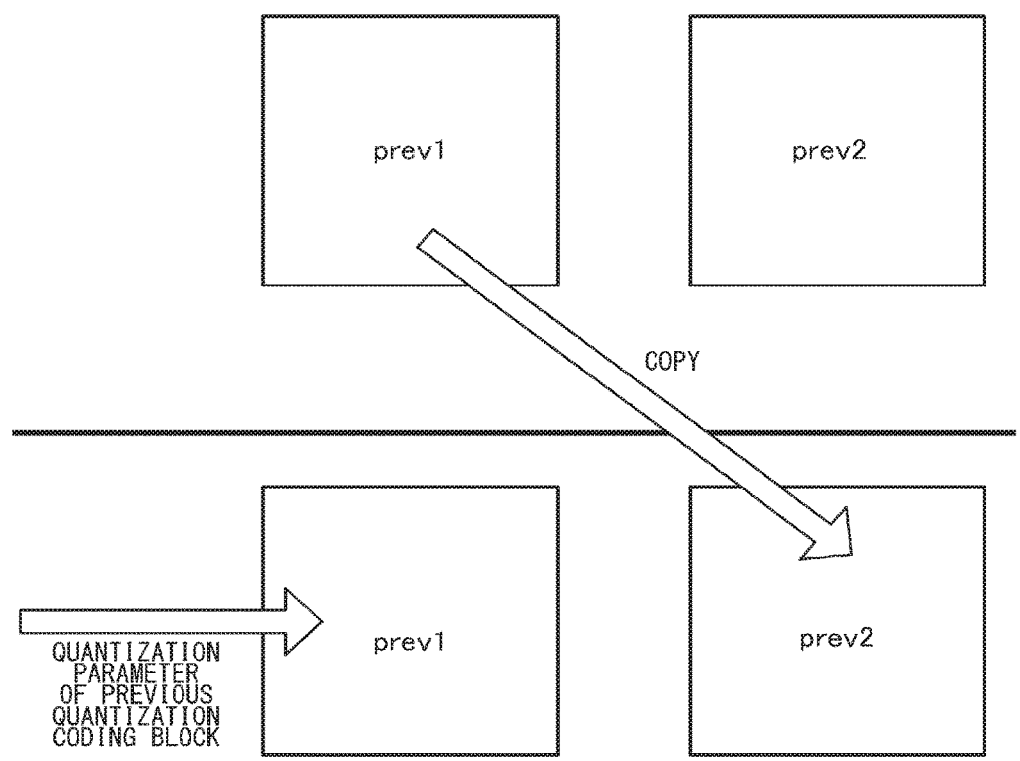
FIG. 17 is a diagram illustrating an example of a prediction quantization parameter calculation process.

FIG. 17 is a diagram illustrating an example of a prediction quantization parameter calculation process. In the actual quantization parameter prediction process, when the quantization coding blocks are switched, the value of prevQP1 is copied to a buffer of prevQP2 and the quantization parameter of the previous quantization coding block is loaded to the buffer which stores prevQP1. The average value calculation process is constantly performed on a prevQP1 buffer and a prevQP2 buffer. In this way, the storage of the quantization parameters is minimized and it is possible to predict the quantization parameter with a small amount of memory. In addition, it is possible to predict the quantization parameters from the spatially neighboring quantization coding blocks, using the previous quantization parameter group in order of encoding and in order of decoding, without calculating the addresses of the spatially neighboring quantization coding blocks and without determining a condition, such as whether the spatially neighboring quantization coding blocks are disposed in the tree block. Therefore, it is possible to perform quantization parameter prediction that has a small amount of processing and is suitable for both code amount control and adaptive quantization.

In addition, an average value may be used as the quantization parameter, using a quantization parameter prevQP3 of a quantization coding block that is three quantization coding blocks before a target quantization coding block or a quantization parameter prevQP4 of a quantization coding block that is four quantization coding blocks before the target quantization coding block. When the number of quantization parameters, which are a prediction source, increases, it is possible to predict the quantization parameters suitable for adaptive quantization.

Embodiment 2

Embodiment 2 differs from Embodiment 1 in that the average value of the quantization parameter of the previous encoded quantization coding block and the quantization parameter of the encoded quantization coding block before the previous encoded quantization coding block is not used, but a weighting average value is used. For prevQP1 and prevQP2, prevQP1 has higher reliability in terms of both code amount control and adaptive quantization. Therefore, prevQP1 has a larger weighting coefficient.

$$\text{pred}QP = 3 \times \text{prev}QP1 + \text{prev}QP2 + 2 \over 4 \quad \text{[Expression 8]}$$

Here, the ratio of the weighting coefficients is 3:1. However, the ratio of the weighting coefficients may be other values. Therefore, the reliability of a prediction quantization parameter is improved, the amount of code of a difference quantization parameter is suppressed, and encoding efficiency is improved.

According to a moving picture encoding device of this embodiment, an optimum prediction quantization parameter is predicted using the quantization parameters of the encoded blocks and is derived and a quantization parameter which is encoded for each block to be encoded is encoded using the difference between the quantization parameter and the prediction quantization parameter. Therefore, it is possible to reduce the amount of code of the quantization parameter and to improve encoding efficiency.

In the above description, the quantization parameter is predicted using the quantization coding block and the coding block as the same unit. However, the quantization parameter may be predicted, using the quantization coding block, which is the encoding and transmission unit of the quantization parameter, and the coding block as different units.

For example, the unit of the quantization coding block may be fixed and a quantization coding block size n may be encoded in a bitstream and then transmitted. The size is represented by the product of the length of the side of a tree block and $\frac{1}{2}^n$ (n is an integer greater than and equal to 0). That is, a value obtained by shifting the length of the side of the tree block to the right by n bits is the length of the side of the quantization coding block. Since this value is determined so as to be the same as that in the tree block structure, it has high affinity with the tree block. In addition, since the tree block is divided into blocks with the same size, it is possible to simply manage or read the quantization parameters stored in the coding information storage memories 113 and 204.

Figure 18:
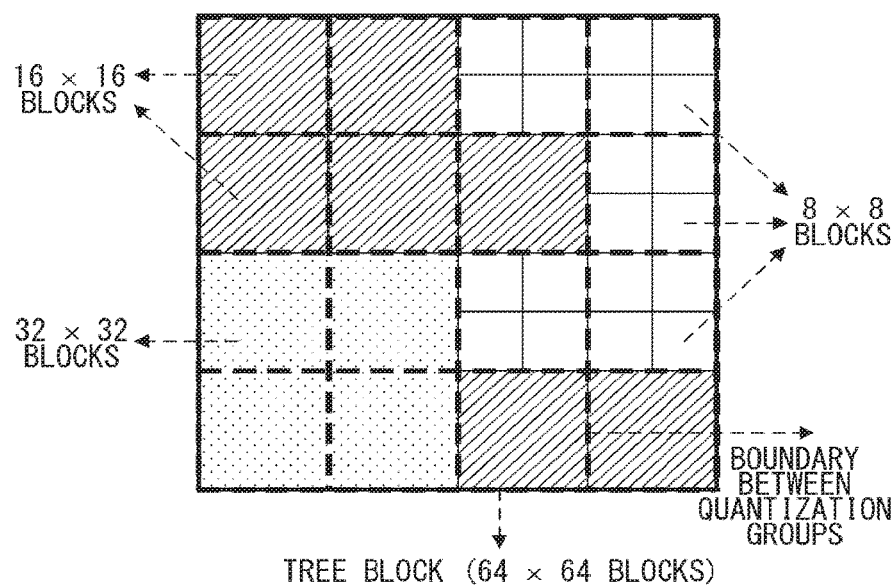
FIG. 18 is a diagram illustrating an example of a quantization coding block.
Figure 19:
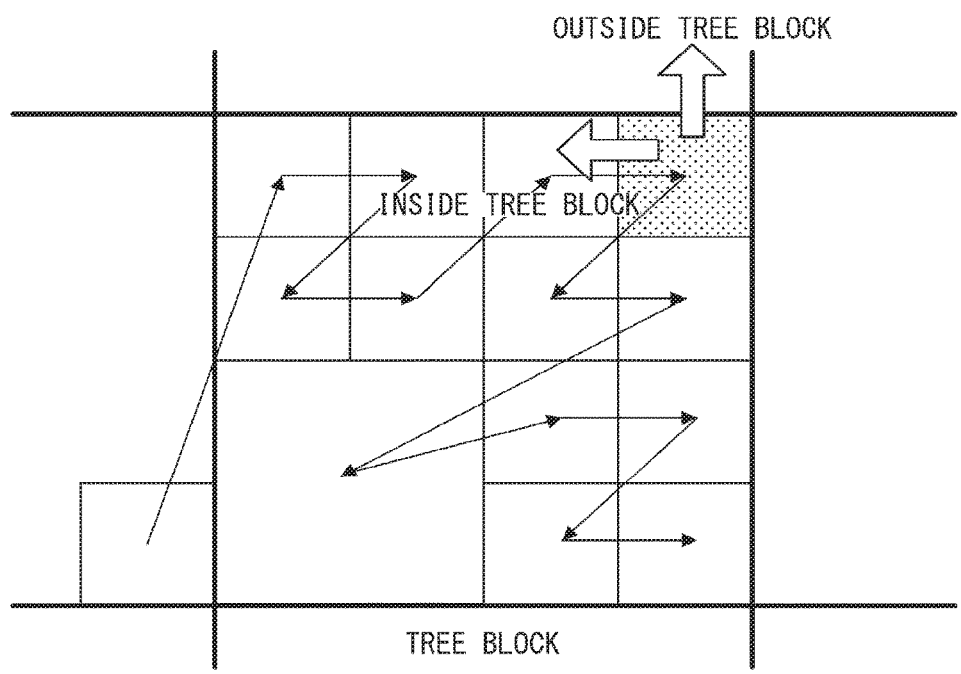
FIG. 19 is a diagram illustrating the relationship between spatially neighboring quantization coding blocks and a tree block.

FIG. 18 illustrates an example in which the tree block is divided in a tree block structure. The tree block has a size of 64.times.64 blocks and is hierarchically divided into four parts. 32.times.32 coding blocks (dotted rectangles in FIG. 18) are obtained by first division, 16.times.16 coding blocks (hatched rectangles in FIG. 18) are obtained by second division, and 8.times.8 coding block (white rectangles in FIG. 18) are obtained by third division. Here, when the quantization coding blocks are 16.times.16 rectangular blocks, the quantization coding block is represented by a thick dotted line in FIG. 18 and quantization parameter prediction is performed for each quantization coding block.

When the size of the coding block to be encoded is greater than that of the quantization coding block size (32.times.32 blocks), for example, the inside of the coding block which is represented by a dotted rectangle in FIG. 18 is divided into four quantization coding blocks. In this case, the coding block is divided into four quantization coding blocks, but one quantization parameter is required for the coding block. Therefore, when the size of the coding block is greater than that of the quantization coding block, the difference quantization parameter is encoded and transmitted after the quantization parameter of the coding block is predicted and the same quantization parameter is stored in the memory areas of the coding information storage memories 113 and 204 corresponding to each of the four divided quantization coding blocks. The quantization parameters overlap each other in the memory and the quantization parameters of the neighboring encoded blocks are easily accessed in the prediction of the quantization parameter.

When the size of the coding block to be encoded is equal to that of the quantization coding block (16.times.16 blocks), the same prediction method as that for predicting the quantization parameter for each coding block is performed.

When the size of the coding block to be encoded is less than that of the quantization coding block (8.times.8 blocks), for example, four coding blocks which are represented by white rectangles in FIG. 18 are accommodated in the quantization coding block. Therefore, all of the coding blocks in the quantization coding block do not have the quantization parameter, but the quantization coding block has one quantization parameter. Each coding block is encoded by the quantization parameter.

The size of the quantization coding block may be directly described in the header information of the bitstream, or the amount of shift of bits indicating whether the size of the tree block is multiplied by $\frac{1}{2}^n$ (n is an integer greater than and equal to 0) may be described in the header information. In addition, particularly, the size of the quantization group is not described in the bitstream, but may be implicitly determined during encoding and decoding.

The bitstream of the moving picture which is output from the moving picture encoding device according to the above-described embodiment has a specific data format such that it can be decoded in correspondence with the encoding method used in the embodiment and the moving picture decoding device corresponding to the moving picture encoding device can decode the bitstream with the specific data format.

When a wired or wireless network is used in order to exchange the bitstream between the moving picture encoding device and the moving picture decoding device, the bitstream may be converted into a data format suitable for the transmission format of a communication path and then transmitted. In this case, the following devices are provided: a moving picture transmission device that converts the bitstream output from the moving picture encoding device into encoding data with a data format suitable for the transmission format of the communication path and transmits the encoding data to a network; and a moving picture reception device that receives the encoding data from the network, restores the encoding data into the bitstream, and supplies the bitstream to the moving picture decoding device.

The moving picture transmission device includes a memory that buffers the bitstream output from the moving picture encoding device, a packet processor that packetizes the bitstream, and a transmitter that transmits the packetized encoding data through the network. The moving picture reception device includes a receiver that receives the packetized encoding data through the network, a memory that buffers the received encoding data, and a packet processor that performs packet processing on the encoding data to generate the bitstream and supplies the bitstream to the moving picture decoding device.

The above-mentioned encoding and decoding process can be implemented as transmission, storage, and reception devices using hardware or it can be implemented by firmware that is stored in, for example, read only memory (ROM) or flash memory, or software if a computer. A firmware program or a software program may be stored in, for example, a computer-readable recording medium and then provided, it may be provided from a server through the wired or wireless network, or it may be provided as terrestrial or satellite digital broadcasting data.

The invention has been described above with reference to the embodiments. The embodiments are illustrative examples and it will be understood by those skilled in the art that various modifications in combinations of the components or the processes of these embodiments can be made and the modifications are also included in the scope and spirit of the invention.

[Item 1]

A picture encoding device that encodes a picture and encodes a difference quantization parameter in a unit of a quantization coding block which is divided from the picture and is a management unit of a quantization parameter, comprising:

a quantization parameter derivation unit that derives a quantization parameter of the quantization coding block to be encoded;

a prediction quantization parameter derivation unit that derives a prediction quantization parameter using the quantization parameters of a plurality of quantization coding blocks which precede the quantization coding block to be encoded in order of encoding;

a difference quantization parameter derivation unit that derives a difference quantization parameter of the quantization coding block to be encoded, using a difference between the quantization parameter of the quantization coding block to be encoded and the prediction quantization parameter; and an encoder that encodes the difference quantization parameter.

[Item 2]

The picture encoding device according to item 1, wherein the prediction quantization parameter derivation unit derives, as the prediction quantization parameter, an average value of the quantization parameters of the plurality of quantization coding blocks which precede the quantization coding block to be encoded in order of encoding.

[Item 3]

The picture encoding device according to item 1 or 2, wherein the unit of the quantization coding block is a maximum coding block divided from the picture or a plurality of quantization coding blocks divided from the maximum coding block.

[Item 4]

The picture encoding device according to any one of items 1 to 3, wherein the prediction quantization parameter derivation unit derives the prediction quantization parameter using the quantization parameters of two quantization coding blocks before the quantization coding block to be encoded in order of encoding.

[Item 5]

A picture encoding method that encodes a picture and encodes a difference quantization parameter in a unit of a quantization coding block which is divided from the picture and is a management unit of a quantization parameter, comprising:

a quantization parameter derivation step of deriving a quantization parameter of the quantization coding block to be encoded;

a prediction quantization parameter derivation step of deriving a prediction quantization parameter using the quantization parameters of a plurality of quantization coding blocks which precede the quantization coding block to be encoded in order of encoding;

a difference quantization parameter derivation step of deriving a difference quantization parameter of the quantization coding block to be encoded, using a difference between the quantization parameter of the quantization coding block to be encoded and the prediction quantization parameter; and an encoding step of encoding the difference quantization parameter.

[Item 6]

A picture encoding program that encodes a picture, encodes a difference quantization parameter in a unit of a quantization coding block which is divided from the picture and is a management unit of a quantization parameter, and causes a computer to perform:

a quantization parameter derivation step of deriving a quantization parameter of the quantization coding block to be encoded;

a prediction quantization parameter derivation step of deriving a prediction quantization parameter using the quantization parameters of a plurality of quantization coding blocks which precede the quantization coding block to be encoded in order of encoding;

a difference quantization parameter derivation step of deriving a difference quantization parameter of the quantization coding block to be encoded, using a difference between the quantization parameter of the quantization coding block to be encoded and the prediction quantization parameter; and an encoding step of encoding the difference quantization parameter.

[Item 7]

A transmission device comprising:

a packet processor that packetizes a bitstream encoded by a picture encoding method of encoding a difference quantization parameter in a unit of a quantization coding block, which is divided from a picture and is a management unit of a quantization parameter, together with the picture to obtain a bitstream; and a transmitter that transmits the packetized bitstream, wherein the picture encoding method includes:

a quantization parameter derivation step of deriving a quantization parameter of the quantization coding block to be encoded;

a prediction quantization parameter derivation step of deriving a prediction quantization parameter using the quantization parameters of a plurality of quantization coding blocks which precede the quantization coding block to be encoded in order of encoding;

a difference quantization parameter derivation step of deriving a difference quantization parameter of the quantization coding block to be encoded, using a difference between the quantization parameter of the quantization coding block to be encoded and the prediction quantization parameter; and an encoding step of encoding the difference quantization parameter.

[Item 8]

A transmission method comprising:

a packet processing step of packetizing a bitstream encoded by a picture encoding method of encoding a difference quantization parameter in a unit of a quantization coding block, which is divided from a picture and is a management unit of a quantization parameter, together with the picture to obtain a bitstream; and a transmission step of transmitting the packetized bitstream, wherein the picture encoding method includes a quantization parameter derivation step of deriving a quantization parameter of the quantization coding block to be encoded, a prediction quantization parameter derivation step of deriving a prediction quantization parameter using the quantization parameters of a plurality of quantization coding blocks which precede the quantization coding block to be encoded in order of encoding, a difference quantization parameter derivation step of deriving a difference quantization parameter of the quantization coding block to be encoded, using a difference between the quantization parameter of the quantization coding block to be encoded and the prediction quantization parameter; and an encoding step of encoding the difference quantization parameter.

[Item 9]

A transmission program that causes a computer to perform:

a packet processing step of packetizing a bitstream encoded by a picture encoding method of encoding a difference quantization parameter in a unit of a quantization coding block, which is divided from a picture and is a management unit of a quantization parameter, together with the picture to obtain a bitstream; and a transmission step of transmitting the packetized bitstream, wherein the picture encoding method includes a quantization parameter derivation step of deriving a quantization parameter of the quantization coding block to be encoded, a prediction quantization parameter derivation step of deriving a prediction quantization parameter using the quantization parameters of a plurality of quantization coding blocks which precede the quantization coding block to be encoded in order of encoding, a difference quantization parameter derivation step of deriving a difference quantization parameter of the quantization coding block to be encoded, using a difference between the quantization parameter of the quantization coding block to be encoded and the prediction quantization parameter, and an encoding step of encoding the difference quantization parameter.

[Item 10]

A picture decoding device that decodes a picture and decodes a bitstream in which a difference quantization parameter is encoded in a unit of a quantization decoding block which is divided from the picture and is a management unit of a quantization parameter, comprising:

a decoder that decodes the bitstream in the unit of the quantization decoding block and extracts a difference quantization parameter of the quantization decoding block to be decoded;

a prediction quantization parameter derivation unit that derives a prediction quantization parameter using the quantization parameters of a plurality of quantization decoding blocks which precede the quantization decoding block to be decoded in order of decoding; and a quantization parameter derivation unit that adds the difference quantization parameter of the quantization decoding block to be decoded and the prediction quantization parameter to derive the quantization parameter of the quantization decoding block to be decoded.

[Item 11]

The picture decoding device according to item 10, wherein the prediction quantization parameter derivation unit derives, as the prediction quantization parameter, an average value of the quantization parameters of the plurality of quantization coding blocks which precede the quantization decoding block to be decoded in order of decoding.

[Item 12]

The picture decoding device according to item 10 or 11, wherein the unit of the quantization decoding block is a maximum decoding block divided from the picture or a plurality of quantization coding blocks divided from the maximum decoding block.

[Item 13]

The picture encoding device according to any one of items 10 to 12, wherein the prediction quantization parameter derivation unit derives the prediction quantization parameter using the quantization parameters of two quantization decoding blocks before the quantization decoding block to be decoded in order of decoding.

[Item 14]

A picture decoding method that decodes a picture and decodes a bitstream in which a difference quantization parameter is encoded in a unit of a quantization decoding block which is divided from the picture and is a management unit of a quantization parameter, comprising:

a decoding step of decoding the bitstream in the unit of the quantization decoding block and extracting a difference quantization parameter of the quantization decoding block to be decoded;

a prediction quantization parameter derivation step of deriving a prediction quantization parameter using the quantization parameters of a plurality of quantization decoding blocks which precede the quantization decoding block to be decoded in order of decoding; and a quantization parameter derivation step of adding the difference quantization parameter of the quantization decoding block to be decoded and the prediction quantization parameter to derive the quantization parameter of the quantization decoding block to be decoded.

[Item 15]

A picture decoding program that decodes a picture, decodes a bitstream in which a difference quantization parameter is encoded in a unit of a quantization decoding block which is divided from the picture and is a management unit of a quantization parameter, and causes a computer to perform:

a decoding step of decoding the bitstream in the unit of the quantization decoding block and extracting a difference quantization parameter of the quantization decoding block to be decoded;

a prediction quantization parameter derivation step of deriving a prediction quantization parameter using the quantization parameters of a plurality of quantization decoding blocks which precede the quantization decoding block to be decoded in order of decoding; and a quantization parameter derivation step of adding the difference quantization parameter of the quantization decoding block to be decoded and the prediction quantization parameter to derive the quantization parameter of the quantization decoding block to be decoded.

[Item 16]

A reception device that receives a bitstream and decodes the bitstream, comprising:

a receiver that receives a bitstream obtained by packetizing a bitstream in which a difference quantization parameter is encoded in a unit of a quantization decoding block, which is divided from a picture and is a management unit of a quantization parameter, together with the picture;

a restoration unit that performs packet processing on the received packetized bitstream to restore the packetized bitstream to an original bitstream;

a decoder that decodes the restored bitstream in the unit of the quantization decoding block and extracts a difference quantization parameter of a quantization decoding block to be decoded;

a prediction quantization parameter derivation unit that derives a prediction quantization parameter using the quantization parameters of a plurality of quantization decoding blocks which precede the quantization decoding block to be decoded in order of decoding; and a quantization parameter derivation unit that adds the difference quantization parameter of the quantization decoding block to be decoded and the prediction quantization parameter to derive the quantization parameter of the quantization decoding block to be decoded.

[Item 17]

A reception method that receives a bitstream and decodes the bitstream, comprising:

a reception step of receiving a bitstream obtained by packetizing a bitstream in which a difference quantization parameter is encoded in a unit of a quantization decoding block, which is divided from a picture and is a management unit of a quantization parameter, together with the picture;

a restoration step of performing packet processing on the received packetized bitstream to restore the packetized bitstream to an original bitstream;

a decoding step of decoding the restored bitstream in the unit of the quantization decoding block to extract a difference quantization parameter of a quantization decoding block to be decoded;

a prediction quantization parameter derivation step of deriving a prediction quantization parameter using the quantization parameters of a plurality of quantization decoding blocks which precede the quantization decoding block to be decoded in order of decoding; and a quantization parameter derivation step of adding the difference quantization parameter of the quantization decoding block to be decoded and the prediction quantization parameter to derive the quantization parameter of the quantization decoding block to be decoded.

[Item 18]

A reception program that receives a bitstream, decodes the bitstream, and causes a computer to perform:

a reception step of receiving a bitstream obtained by packetizing a bitstream in which a difference quantization parameter is encoded in a unit of a quantization decoding block, which is divided from a picture and is a management unit of a quantization parameter, together with the picture;

a restoration step of performing packet processing on the received packetized bitstream to restore the packetized bitstream to an original bitstream;

a decoding step of decoding the restored bitstream in the unit of the quantization decoding block to extract a difference quantization parameter of a quantization decoding block to be decoded;

a prediction quantization parameter derivation step of deriving a prediction quantization parameter using the quantization parameters of a plurality of quantization decoding blocks which precede the quantization decoding block to be decoded in order of decoding; and a quantization parameter derivation step of adding the difference quantization parameter of the quantization decoding block to be decoded and the prediction quantization parameter to derive the quantization parameter of the quantization decoding block to be decoded.

What is claimed is:

1. A picture decoding device that decodes a picture and decodes a bitstream in which a difference quantization parameter is encoded in a unit of a quantization decoding block which is divided from the picture and is a management unit of a quantization parameter, comprising:

a decoder that decodes the bitstream in the unit of the quantization decoding block and extracts a difference quantization parameter of a first quantization decoding block to be decoded;

a prediction quantization parameter derivation unit that derives a prediction quantization parameter by averaging quantization parameters of two quantization decoding blocks which precede the first quantization decoding block to be decoded in order of decoding; and a quantization parameter derivation unit that adds the difference quantization parameter of the first quantization decoding block to be decoded and the prediction quantization parameter to derive a quantization parameter of the first quantization decoding block to be decoded, wherein the prediction quantization parameter derivation unit derives the prediction quantization parameter using two quantization parameters including:

one quantization parameter of a previous quantization decoding block which immediately precedes the first quantization decoding block to be decoded in order of decoding, and another quantization parameter of a quantization decoding block which precedes the previous quantization decoding block in order of decoding and is not spatially neighboring the first quantization decoding block to be decoded, and wherein a size of the quantization decoding block is set independently of a size of a decoding block which is a basic unit of a decoding process.

2. A picture decoding method that decodes a picture and decodes a bitstream in which a difference quantization parameter is encoded in a unit of a quantization decoding block which is divided from the picture and is a management unit of a quantization parameter, comprising:

a decoding step of decoding the bitstream in the unit of the quantization decoding block and extracting a difference quantization parameter of a first quantization decoding block to be decoded;

a prediction quantization parameter derivation step of deriving a prediction quantization parameter by averaging quantization parameters of two quantization decoding blocks which precede the first quantization decoding block to be decoded in order of decoding; and a quantization parameter derivation step of adding the difference quantization parameter of the first quantization decoding block to be decoded and the prediction quantization parameter to derive a quantization parameter of the first quantization decoding block to be decoded, wherein the prediction quantization parameter derivation step derives the prediction quantization parameter using two quantization parameters including:
one quantization parameter of a previous quantization decoding block which immediately precedes the first quantization decoding block to be decoded in order of decoding, and
another quantization parameter of a quantization decoding block which precedes the previous quantization decoding block in order of decoding and is not spatially neighboring the first quantization decoding block to be decoded, and wherein a size of the quantization decoding block is set independently of a size of a decoding block which is a basic unit of a decoding process.

* * * * *